US012242067B2

(12) United States Patent
Kim et al.

(10) Patent No.: US 12,242,067 B2
(45) Date of Patent: Mar. 4, 2025

(54) WEARABLE DEVICE, METHOD, AND NON-TRANSITORY COMPUTER READABLE STORAGE MEDIUM FOR DISPLAYING VISUAL OBJECT INDICATING WEATHER CONDITION

(71) Applicant: Samsung Electronics Co., Ltd., Suwon-si (KR)

(72) Inventors: Sunho Kim, Suwon-si (KR); Kyunghwa Kim, Suwon-si (KR); Sanghyun Park, Suwon-si (KR); Minseoung Woo, Suwon-si (KR); Sanga Yoo, Suwon-si (KR); Hyunjun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/344,241

(22) Filed: Jun. 29, 2023

(65) Prior Publication Data
US 2024/0045212 A1 Feb. 8, 2024

Related U.S. Application Data

(63) Continuation of application No. PCT/KR2023/007617, filed on Jun. 2, 2023.

(30) Foreign Application Priority Data

Aug. 4, 2022 (KR) .................. 10-2022-0097047
Nov. 2, 2022 (KR) .................. 10-2022-0144809

(51) Int. Cl.
G06F 3/048 (2013.01)
G02B 27/00 (2006.01)
(Continued)

(52) U.S. Cl.
CPC ..... G02B 27/0172 (2013.01); G02B 27/0093 (2013.01); G02B 27/0176 (2013.01);
(Continued)

(58) Field of Classification Search
CPC ........ G06F 1/163; G06F 3/012; G06F 3/0481; G06T 19/006; G06T 2200/04; G06T 2200/24
See application file for complete search history.

(56) References Cited

U.S. PATENT DOCUMENTS 9,342,610 B2  5/2016 Liu et al.
10,712,819 B2  7/2020 Byerley
(Continued)

FOREIGN PATENT DOCUMENTS

EP   3 155 560 B1   5/2020
KR   10-2020-0029998 A   3/2020
(Continued)

OTHER PUBLICATIONS

International Search Report dated Sep. 12, 2023; International Appln. No. PCT/KR2023/007617.

*Primary Examiner* — Liliana Cerullo
(74) *Attorney, Agent, or Firm* — Jefferson IP Law, LLP

(57) ABSTRACT

A wearable device is provided. The wearable device includes a camera, and a processor. The processor may be configured to display, based on a direction in which a region in an image faces being different from a reference direction, a widget or a first visual object including at least a part of information, in at least a part of the region in the image. The processor may be configured to display, based on the direction in which the region in the image faces being corresponding to the reference direction, a second visual object representing a virtual outdoor environment with a weather condition, in the region in the image.

20 Claims, 28 Drawing Sheets

(51) Int. Cl.
  *G02B 27/01* (2006.01)
  *G06F 1/16* (2006.01)
  *G06F 3/01* (2006.01)
  *G06F 3/0481* (2022.01)
  *G06T 19/00* (2011.01)

(52) U.S. Cl.
  CPC .............. *G06F 1/163* (2013.01); *G06F 3/012* (2013.01); *G06F 3/0481* (2013.01); *G06T 19/006* (2013.01); *G02B 2027/0138* (2013.01); *G02B 2027/014* (2013.01); *G02B 2027/0141* (2013.01); *G06T 2200/04* (2013.01); *G06T 2200/24* (2013.01)

(56) References Cited

U.S. PATENT DOCUMENTS

| | | |
|---|---|---|
| 11,354,867 B2 | 6/2022 | Burns et al. |
| 2013/0050258 A1 | 2/2013 | Liu et al. |
| 2017/0161939 A1 | 6/2017 | Sugden et al. |
| 2017/0256096 A1 | 9/2017 | Faaborg et al. |
| 2020/0133392 A1* | 4/2020 | Byerley ................ H04L 67/131 |
| 2021/0279966 A1 | 9/2021 | Burns et al. |
| 2021/0295602 A1* | 9/2021 | Scapel ................ G06F 3/04815 |
| 2021/0303129 A1 | 9/2021 | Li et al. |
| 2022/0229534 A1 | 7/2022 | Terre et al. |
| 2022/0236791 A1 | 7/2022 | Bond et al. |
| 2022/0245906 A1 | 8/2022 | Burns et al. |
| 2023/0393700 A1* | 12/2023 | Louch .................... G09G 5/026 |

FOREIGN PATENT DOCUMENTS

| | | |
|---|---|---|
| KR | 10-2204919 B1 | 1/2021 |
| KR | 10-2364275 B1 | 2/2022 |
| KR | 10-2022-0058940 A | 5/2022 |
| KR | 10-2022-0086195 A | 6/2022 |
| WO | WO-2023207174 A1 * | 11/2023 |

* cited by examiner

WEARABLE DEVICE, METHOD, AND NON-TRANSITORY COMPUTER READABLE STORAGE MEDIUM FOR DISPLAYING VISUAL OBJECT INDICATING WEATHER CONDITION

CROSS-REFERENCE TO RELATED APPLICATION(S)

This application is a continuation application, claiming priority under § 365(c), of an International application No. PCT/KR2023/007617, filed on Jun. 2, 2023, which is based on and claims the benefit of a Korean patent application number 10-2022-0097047, filed on Aug. 4, 2022, in the Korean Intellectual Property Office, and of a Korean patent application number 10-2022-0144809, filed on Nov. 2, 2022, in the Korean Intellectual Property Office, the disclosure of each of which is incorporated by reference herein in its entirety.

TECHNICAL FIELD

The disclosure relates to a wearable device, a method, and a non-transitory computer readable storage media for displaying a visual object indicating a weather condition.

BACKGROUND ART

In order to provide an enhanced user experience, electronic devices are under development that provide an augmented reality (AR) service displaying computer-generated information in conjunction with objects in the real-world. Such an electronic device may be a wearable device capable of being worn by a user. For example, the electronic device may be AR glasses. For example, the electronic device may be a virtual reality (VR) device. For example, the electronic device may be a video see-through (VST) device.

The above information is presented as background information only to assist with an understanding of the disclosure. No determination has been made, and no assertion is made, as to whether any of the above might be applicable as prior art with regard to the disclosure.

DISCLOSURE

Technical Solution

A wearable device is provided. The wearable device may include a camera. The wearable device may include a display. The wearable device may include a processor. The processor may be configured to display, through the display, a widget including information on a weather condition, in an image obtained through the camera. The processor may be configured to identify an event that moves the widget. The processor may be configured to identify a region in the image to which the widget is to be moved according to the event. The processor may be configured to display, when a direction in which the region in the image faces is different from a reference direction, the widget or a first visual object including at least a portion of the information in at least a portion of the region in the image. The processor may be configured to display, when the direction corresponds to the reference direction, a second visual object representing a virtual outdoor environment with the weather condition, in the region in the image.

A method is provided. The method may be executed in a wearable device including a camera and a display. The method may include displaying, through the display, a widget including information on a weather condition, in an image obtained through the camera. The method may include identifying an event that moves the widget. The method may include identifying a region in the image to which the widget is to be moved according to the event. The method may include displaying, when a direction in which the region in the image faces is different from a reference direction, the widget or a first visual object including at least a portion of the information in at least a portion of the region in the image. The method may include displaying, when the direction corresponds to the reference direction, a second visual object representing a virtual outdoor environment with the weather condition, in the region in the image.

A non-transitory computer readable storage medium is provided. The non-transitory computer-readable storage medium may store one or more programs. The one or more programs may include instructions that, when executed by a processor of a wearable device including a camera and a display, cause the wearable device to display, through the display, a widget including information on a weather condition, in an image obtained through the camera. The one or more programs may include instructions that cause, when executed by the processor, the wearable device to identify an event that moves the widget. The one or more programs may include instructions that cause, when executed by the processor, the wearable device to identify a region in the image to which the widget is to be moved according to the event. The one or more programs may include instructions that cause, when executed by the processor, the wearable device to display, when a direction in which the region in the image faces is different from a reference direction, the widget or a first visual object including at least a portion of the information in at least a portion of the region in the image. The one or more programs may include instructions that cause, when executed by the processor, the wearable device to display, when the direction corresponds to the reference direction, a second visual object representing a virtual outdoor environment with the weather condition, in the region in the image.

DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR INVENTION

Figure 1:
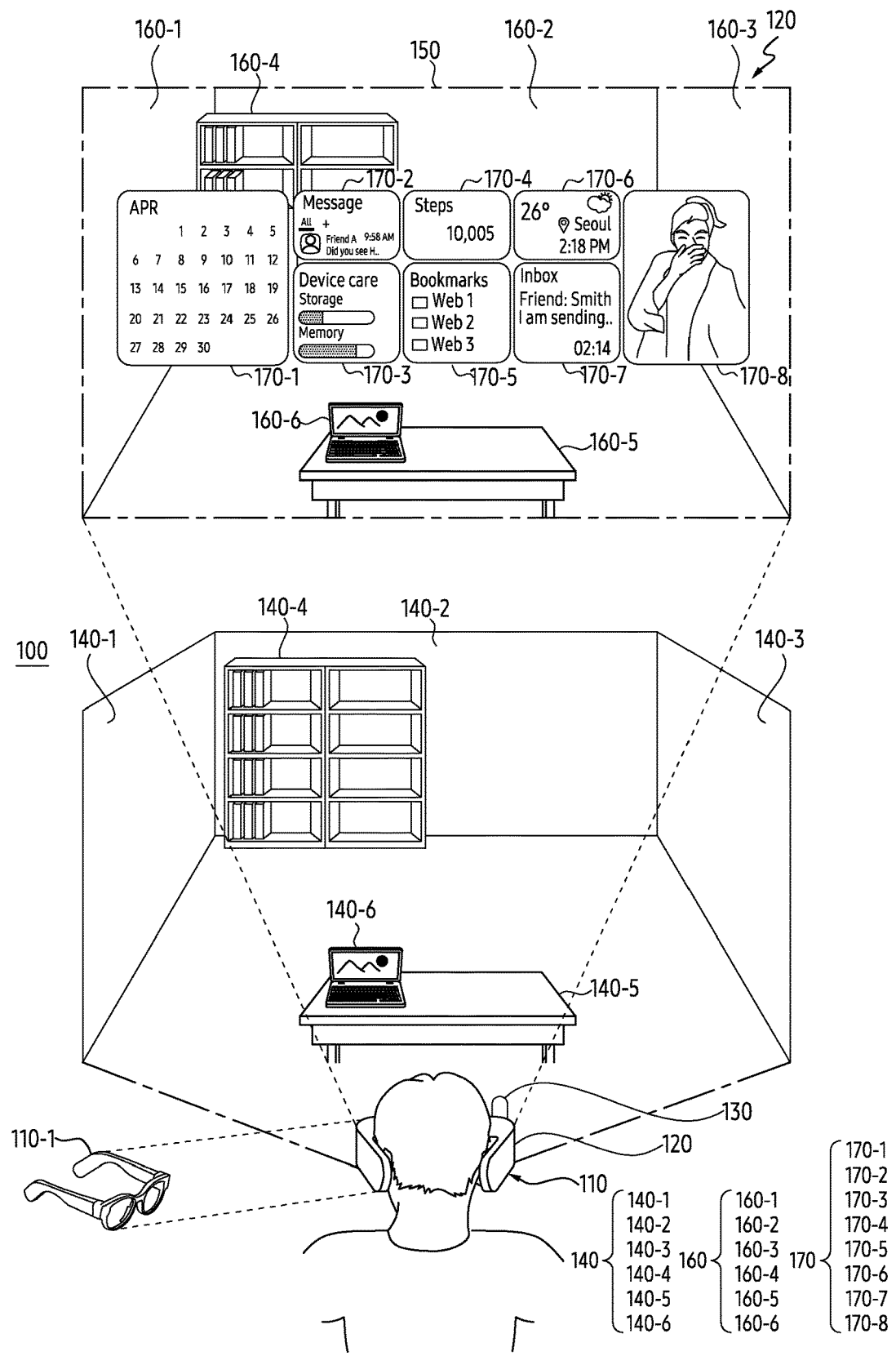
FIG. 1 illustrates an exemplary environment including a wearable device, according to an embodiment.

FIG. 1 illustrates an exemplary environment including a wearable device according to an embodiment.

Referring to FIG. 1, an indoor environment 100 may include a wearable device 110 worn by a user.

For example, the wearable device 110 may be used to provide an augmented reality (AR) service. For example, the wearable device 110 may include a processor (not shown in FIG. 1) (e.g., a processor 2710 in FIG. 27), a display 120, and a camera 130, for providing an AR service.

For example, in the case that the wearable device 110 is a video see-through or visual see-through (VST) device, the display 120 may include at least one opaque display. For example, the processor may display an image 150 representing at least a part of the indoor environment 100 located within the field of view (FOV) of the camera 130, through the display 120. For example, the image 150 may include visual objects 160 corresponding to external objects 140 in the indoor environment 100, thereby representing the at least a part of indoor environment 100. As a non-limiting example, the visual objects 160 may include a visual object 160-1 corresponding to a wall 140-1 in the indoor environment 100, a visual object 160-2 corresponding to a wall 140-2 in the indoor environment 100, a visual object 160-3 corresponding to a wall 140-3 in the indoor environment 100, a visual object 160-4 corresponding to a bookshelf 140-4 in the indoor environment 100, a visual object 160-5 corresponding to a desk 140-5 in the indoor environment 100, and a visual object 160-6 corresponding to an electronic device 140-6 in the indoor environment 100. For example, the image 150 may include at least one visual object 170 that does not actually exist in the indoor environment 100. As a non-limiting example, the at least one visual object 170 may include a visual object 170-1 corresponding to a user interface or a widget for schedule management, a visual object 170-2 corresponding to a user interface or a widget for message management, a visual object 170-3 corresponding to a user interface or a widget for device management, a visual object 170-4 corresponding to a user interface or a widget for health management, a visual object 170-5 corresponding to a user interface or a widget for web-page management, a visual object 170-6 corresponding to a user interface or a widget for providing information on a weather condition, a visual object 170-7 corresponding to a user interface or a widget for email management, and a visual object 170-8 corresponding to a user interface or a widget for image management. For example, the at least one visual object 170 may be obtained by the processor of the wearable device 110 in a standalone state and displayed through the display 120 in the image 150. For example, when the wearable device 110 obtains at least one visual object 170 in the standalone state, it may indicate that the wearable device 110 obtains the at least one visual object 170 without assistance from another device, but the disclosure is not limited thereto. For example, at least one visual object 170 may be displayed through the display 120 in the image 150, based on information received from an electronic device (e.g., a smartphone, tablet, etc.) connected to the wearable device 110. For example, the at least one visual object 170 may include an augmented reality (AR) object, an execution screen of a software application, a user interface, a widget, and/or a window.

For example, in the case that the wearable device 110 is an AR glass 110-1, the display 120 may include at least one transparent display. For example, since at least part of the indoor environment 100 located in a user's field of view (FOV) is viewed through the display 120, the processor may represent a scene such as an image 150, by displaying at least one visual object 170 through at least one transparent display, that is, the display 120.

Hereinafter, description will be made of operations executed by the processor of the wearable device 110, which is a VST device, but it is only for the convenience of explanation. For example, the operations may be performed by the processor of the wearable device 110, which is an AR glass 110-1. For example, when the operations are executed by the processor of the wearable device 110 which is the AR glass 110-1, the visual objects 160 may be respectively replaced by the external objects 140 viewed through the at least one transparent display.

Figure 2:
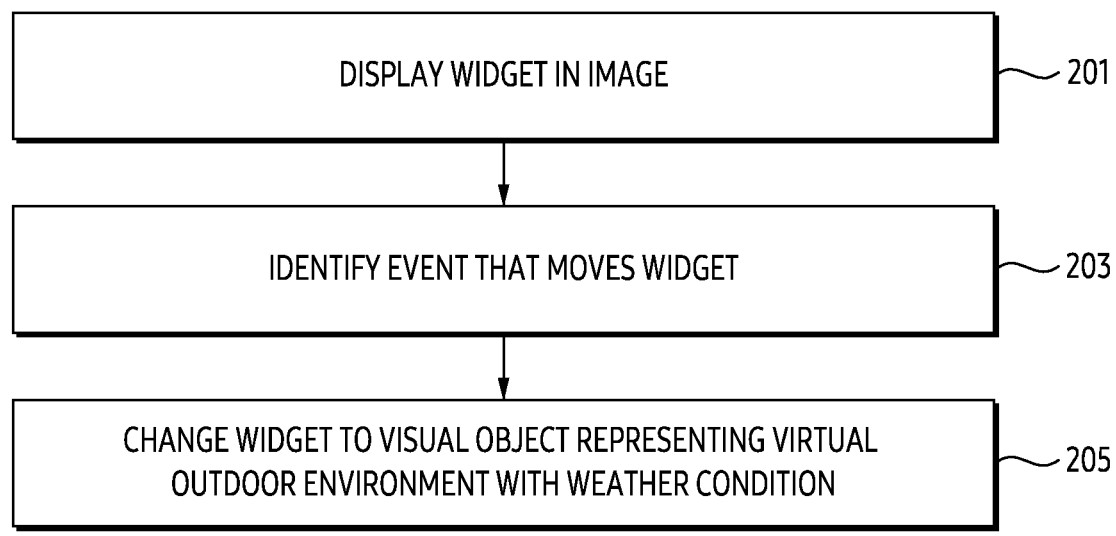
FIG. 2 illustrates an exemplary method of displaying a visual object representing a virtual outdoor environment with a weather condition, according to an embodiment.

FIG. 2 illustrates an exemplary method of displaying a visual object representing a virtual outdoor environment with a weather condition, according to an embodiment. This method may be executed by the wearable device 110 or the processor of the wearable device 110 illustrated in FIG. 1.

Referring to FIG. 2, in operation 201, the processor may display a widget in an image. For example, the widget may be used to provide information. For example, the information may be related to a weather condition (or a type of weather). For example, the weather condition (or the type of weather) may be visually recognized by means of the information in the widget.

For example, the image may be obtained through the camera 130. For example, the image may represent an indoor environment (e.g., the indoor environment 100) where the wearable device 110 is located. For example, the image may be changed based on a change in position of the camera 130 (or change in position of the wearable device 110) and/or a change in posture of the camera 130 (or a change in posture of the wearable device 110).

For example, the widget may be an object to provide a user with information (e.g., temperature, humidity, precipitation, wind strength, air pressure, degree of cloudiness, and/or degree of fine dust, which are to be described below), or to provide an interaction between the user and the wearable device 110. For example, the widget may be a reduced user interface of a software application (e.g., a software application for obtaining a weather condition or a software application for providing a weather condition). For example, a size of the widget may be larger than a size of an executable object (or icon) used to execute the software application. However, the disclosure is not limited thereto. The widget to be illustrated in the following descriptions may be replaced with a user interface.

For example, the information may be included in the widget. For example, the information in the widget may be represented or indicated through a text and/or a visual element.

For example, the text may represent at least part of the weather condition. For example, the text may indicate a temperature around the wearable device 110. For example, the text may indicate a humidity around the wearable device 110. For example, the text may indicate a precipitation around the wearable device 110. For example, the text may indicate an intensity and/or a direction of wind around the wearable device 110. For example, the text may indicate an atmospheric pressure around the wearable device 110. For example, the text may represent cloudiness around the wearable device 110. However, the disclosure is not limited thereto.

For example, the text may represent data for auxiliary explanation of the weather condition. For example, the text may represent a geographical region in which the wearable device 110 is located or a geographical region with the weather condition. For example, the text may indicate the time of the geographical region, but the disclosure is not limited thereto.

For example, the visual element may include information in a manner that is distinguished from the text as above. For example, the visual element may be an image including a static image and/or a dynamic image (e.g., a video). For example, the user may recognize the information that the visual element represents through the representation of the visual element. For example, the visual element may represent at least part of the weather condition. For example, the visual element may indicate a sunny or clear weather. For example, the visual element may indicate a partially cloudy weather. For example, the visual element may indicate a cloudy weather. For example, the visual element may indicate an overcast cloudy weather. For example, the visual element may represent a rainy weather. For example, the visual element may represent a drizzling weather. For example, the visual element may represent a snowy weather. For example, the visual element may represent a stormy weather. However, the disclosure is not limited thereto.

For example, the information may explicitly represent a weather condition for a visual object representing a virtual outdoor environment with the weather condition, as will be illustrated below. For example, the information may explicitly represent the weather condition with respect to the visual object. For example, the visual object may represent a state of an outdoor environment to which the weather condition is applied, while the information may explicitly represent the weather condition. The information may be illustrated in FIG. 3.

Figure 3:
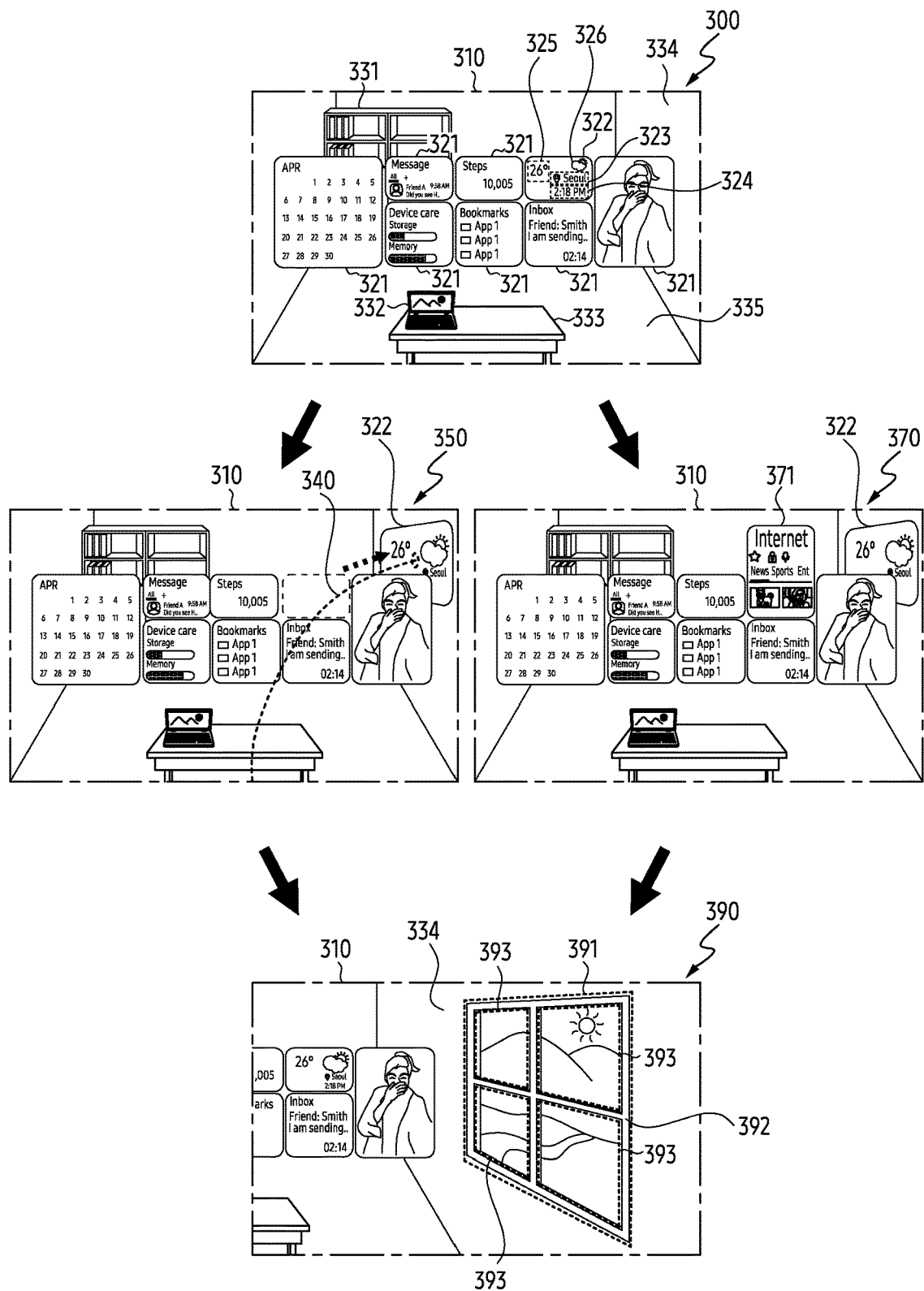
FIG. 3 illustrates an example of a visual object displayed based on an event, according to an embodiment.

FIG. 3 illustrates an example of a visual object displayed based on an event, according to an embodiment.

Referring to FIG. 3, the processor may provide a state 300 according to operation 201. For example, in the state 300, the processor may display an image 310 obtained through the camera 130 and representing an indoor environment in which the wearable device 110 is located. For example, in the state 300, the image 310 may include widgets 321 (or user interfaces 321), which are virtual objects that do not exist in the real indoor environment. For example, in the state 300, each of the widgets 321 may include information provided from a software application.

For example, in the state 300, a weather-related widget 322 (or user interface 322) among the widgets 321 may include information on a weather condition. For example, the widget 322 may include a text 323 indicating the geographical region in which the wearable device 110 is located. For example, the widget 322 may include a text 324 indicating the time (or the current time, e.g., a local time) of the geographical region indicated by the text 323. For example, the widget 322 may include a text 325 indicating the temperature of the geographic area indicated by the text 323 or the geographic area where the wearable device 110 is located. For example, the widget 322 may include a visual element 326 indicating that the weather condition around the wearable device 110 is partially cloudy. For example, the text 325 and the visual element 326 in the widget 322 may explicitly represent the weather condition.

FIG. 3 illustrates a plurality of widgets 321 including a widget 321, but the widgets 321 may be replaced with other visual objects. For example, at least some of the widgets 321 may be replaced with an AR object, an execution screen of a software application, a user interface, or a window.

For example, in the state 300, the remaining objects in the image 310 except for the widgets 321 may correspond to external objects (or real objects) in the indoor environment, respectively. For example, an object 331 may correspond to a bookcase located in the indoor environment. For example, an object 332 may correspond to a laptop located in the indoor environment. For example, an object 333 may correspond to a table located in the indoor environment. For example, an object 334 may correspond to a wall located in the indoor environment. For example, an object 335 may correspond to a floor located in the indoor environment.

Referring back to FIG. 2, in operation 203, the processor may identify an event that moves the widget.

For example, the event may include receiving a user input to move the widget.

For example, the user input may include an input indicating selection of the widget and an input indicating movement of the widget. For example, the input indicating selection of the widget may be caused by a user's hand identified by the camera of the wearable device 110, that is, indicated by selection of the widget, by a user's gesture identified by the camera of the wearable device 110, by an input device connected to the wearable device 110 (e.g., a controller), by a gaze (e.g., eye-gazing maintained for a predetermined time duration with respect to the widget) identified by the camera the wearable device 110, or by a voice command. For example, the input indicating moving the widget may be caused based on a movement of the user's hand, based on a user's gesture indicating moving the widget, by a movement of the input device, by a movement of the eye-gazing, or by another voice command following the voice command (e.g., representing or indicating the movement of the widget). However, the disclosure is not limited thereto. For example, the gaze may be identified through another camera of the wearable device 110, which is different from the camera 130. For example, the camera may face the user's eyes. However, the disclosure is not limited thereto.

For example, the event may include moving the widget without any user input received for the widget. For example, the event may include moving the widget, in response to displaying a new user interface, a new widget, or a new window. For example, the event may include identifying whether the number of windows (e.g., user interfaces and/or widgets) displayed in the image exceeds a predetermined number according to displaying of such a new window. However, the disclosure is not limited thereto.

The event may be illustrated with reference to FIG. 3.

Referring to FIG. 3, in a state 300, the processor may identify the event that receives a user input for moving a held widget 322 through a pointer 340. The processor may change the state 300 to the state 350 in response to the event. In the state 350, the processor may display a widget 322 that is floated on the image 310 and moved according to the movement of the pointer 340. For example, the widget 322 floating on the image 310 and moving according to the movement of the pointer 340 in the state 350 may be enlarged. However, the disclosure is not limited thereto.

For example, the movement of the pointer 340 may be caused based on a movement of the user's hand, based on a gesture indicating moving the widget, by a movement of the input device, by a movement of the eye-gaze, or by another voice command following the voice command (e.g., representing or indicating a movement of the widget). However, the disclosure is not limited thereto.

FIG. 3 illustrates an example in which the pointer 340 is displayed in the image 310, but in other examples, the pointer 340 may not be displayed in the image 310.

For example, in the state 300, the processor may identify the event that receives a user input for newly displaying a widget 371. The user input may indicate that a software application providing the widget 371 is executed. For example, the processor may change the state 300 to the state 370, based on identifying that there is not enough space in the image 310 for displaying additional widgets, in response to the event. For example, the processor may identify a lack of space in the image 310, based on identifying that more than a predetermined number of widgets (or user interfaces) are displayed in the image 310 according to execution of a software application providing the widget 371. For example, the processor may identify a lack of space in the image 310, based on identifying that more than a predetermined number of widgets (or user interfaces) are displayed within an area in the image 310 corresponding to the front of the user. For example, the processor may identify such a lack of space in the image 310, based on identifying that the size of the widgets displayed prior to the widget 371 is reduced to less than a reference size according to the widget 371 to be displayed in the image 310. However, the disclosure is not limited thereto.

In the state 370, the processor may display the widget 371 in the region in which the widget 322 was displayed. In the state 370, the processor may display the widget 322 moved along with the displaying of widget 371. For example, the widget 322 moved along with the displaying of the widget 371 may be floated on the image 310. For example, the widget 322 moved according to the displaying of the widget 371 may be enlarged. However, the disclosure is not limited thereto.

Referring back to FIG. 2, in operation 205, the processor may change the widget to a visual object representing a virtual outdoor environment with the weather condition, based on the event.

For example, the visual object may be a second type of widget that has been changed from a first type of widget displayed in operation 201 and moved in operation 203. For example, the visual object may represent a scene of looking outdoors at a location (e.g., indoors) of the wearable device 110. For example, the visual object may include a background image representing an outdoor area with the weather condition. For example, the background image may represent the location of the wearable device 110, the weather condition, and the time (e.g., the current time or hour) through the virtual outdoor environment. As a non-limiting example, the visual object may represent an out-of-window landscape (or outdoor landscape) on a sunny morning, an out-of-window landscape (or outdoor landscape) on a cloudy noontime of the day, an out-of-window landscape (or outdoor landscape) on a rainy evening, and/or an out-of-window landscape (or outdoor landscape) on snowy night.

For example, these landscapes may be represented through the virtual outdoor environment.

For example, the processor may move the widget to an area identified based on the event. For example, in the case that the event is to receive the user input moving the widget, the area may be an area in which the user input is released. For example, in the case that the event is to display a new user interface, a new widget, or a new window, the area may be a predetermined area. However, the disclosure is not limited thereto.

For example, the visual object, unlike the widget, may implicitly or indirectly represent the weather condition. For example, the visual object may represent the virtual outdoor environment with the weather condition. For example, the visual object may be identified among a plurality of visual objects representing a plurality of weather conditions, respectively. For example, each of the plurality of visual objects may represent a virtual outdoor environment having each of the plurality of weather conditions. For example, the plurality of visual objects may be pre-registered in the wearable device 110.

For example, the visual object may include a visual element corresponding to a window and a visual element corresponding to the virtual outdoor environment, viewed through the window, to indicate that the environment represented through the visual object is the outdoors. The visual object may be illustrated with reference to FIG. 3.

Referring to FIG. 3, the processor may display a visual object 391 changed from the widget 322 in the state 390 changed through the state 350 (or the state 370) from the state 300. For example, the visual object 391 may represent the virtual outdoor environment having the weather condition, unlike the widget 322. For example, the visual object 391 may include a visual element 392 to indicate that the environment represented by the visual object 391 is the outdoors. For example, the visual element 392 may be a window. For example, the visual object 391 may include a visual element 393 representing the virtual outdoor environment viewed through the visual element 392. For example, the virtual outdoor environment represented by the visual element 393 may include the weather condition. For example, as in the state 390, the visual element 393 may represent the virtual outdoor environment showing partially cloudy weather.

For example, visual object 391 may be displayed within a visual object 334 recognized as a background part of the image 310. For example, the visual object 391 may be referred to as a second visual object 391 hereinafter. For example, since the visual object 391 is displayed at a position recognized as part of the background of the image 310, the space in which the widget 322 was displayed may be used as a space for displaying another widget (or another user interface). For example, the wearable device 110 can enhance availability of the virtual space provided through the image 310 while providing information on the weather condition through the displaying of the visual object 391.

Figure 4:
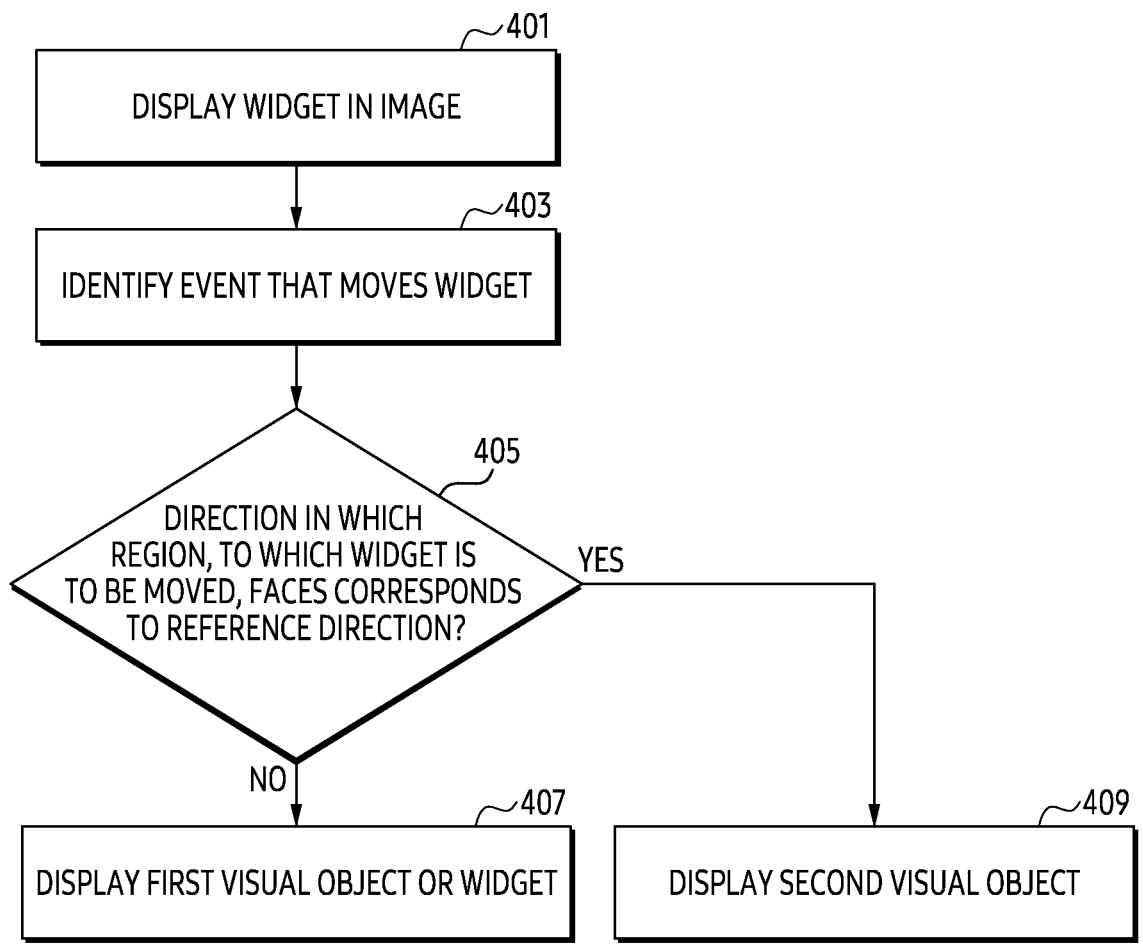
FIG. 4 illustrates an exemplary method of adaptively displaying a second visual object representing a virtual outdoor environment with a weather condition according to a direction in which a region to which a widget is to be moved faces, according to a direction.

FIG. 4 illustrates an exemplary method of adaptively displaying a second visual object representing a virtual outdoor environment with a weather condition according to a direction in which an area to which a widget is to be moved faces. This method may be executed by the wearable device 110 or the processor of the wearable device 110 illustrated in FIG. 1.

Referring to FIG. 4, in operation 401, the processor may display a widget including information on a weather condition (or a type of weather) in an image. For example, the image may be an image illustrated through the description of FIGS. 2 and 3. For example, the widget may be a widget illustrated through the description of FIGS. 2 and 3.

In operation 403, the processor may identify an event moving the widget. For example, the event may be an event illustrated through the description of FIGS. 2 and 3.

In operation 405, in response to the event, the processor may identify whether a direction in which a region in the image, to which the widget is to be moved, faces corresponds to a reference direction.

For example, operation 405 may be performed to identify whether to change the widget to a second visual object (e.g., a visual object representing the virtual outdoor environment with the weather conditions illustrated in the description of FIGS. 2 and 3) to be illustrated below.

For example, the second visual object may provide homogeneity or heterogeneity to the virtual space provided through the image, according to the direction in which the region faces. For example, an outdoor environment may be usually seen through doors or windows located in a wall. For example, since the second visual object represents the virtual outdoor environment with the weather condition, the reference direction may correspond to the direction in which the window in the wall faces. For example, the reference direction may be defined for comparison with a direction in which the region in the image, to which the widget is to be moved, faces. For example, the reference direction for comparison with the direction in which the region in the image, to which the widget is to be moved, faces may be perpendicular to the direction in which the ground faces. For example, the region facing the direction corresponding to the reference direction may be perpendicular to the ground. For example, the direction corresponding to the reference direction may indicate not only a direction perpendicular to a direction in which the ground faces, but also a direction substantially perpendicular to a direction in which the ground faces. For example, the direction corresponding to the reference direction may indicate that an angle between the ground and the region is within a reference range. As a non-limiting example, the reference range may indicate an angular range between about 75 degrees and about 105 degrees. However, the disclosure is not limited thereto.

For example, displaying the second visual object in the region facing the direction different from the reference direction may reduce the quality of the virtual space, while displaying the second visual object in the region facing the direction corresponding to the reference direction may enhance the quality of the virtual space. As a non-limiting example, viewing the outdoor environment in a table or floor horizontally positioned may provide the user with a sense of heterogeneity, and thus, displaying the second visual object in the region facing the direction different from the reference direction may reduce the quality of the virtual space. As a non-limiting example, since the outdoor environment viewed through the window in the wall vertically positioned does not provide the user with a sense of heterogeneity, displaying the second visual object in the region facing the direction corresponding to the reference direction may enhance the quality of the virtual space.

For example, the processor may execute operation 407 based on the direction in which the region in the image faces being different from the reference direction, and execute operation 409 based on the direction in which the region in the image faces corresponding to the reference direction.

In operation 407, the processor may display the first visual object or the widget in the region, based on identifying that the direction, in which the region to which the widget is to be moved, faces is different from the reference direction.

For example, the first visual object or the widget displayed in operation 407 may include at least part of the information in the widget displayed in operation 401. For example, the first visual object may include at least part of the information and have a shape different from the shape of the widget displayed in operation 401. For example, the first visual object may have a three-dimensional shape, unlike the widget having a two-dimensional shape. However, the disclosure is not limited thereto.

For example, the first visual object may have a shape identified based on the direction in which the region is directed. For example, in the case that the region faces a direction corresponding to the direction in which the ground faces, the first visual object may have a shape of an object that may be located on the region. However, the disclosure is not limited thereto.

For example, the first visual object may have a size identified based on the size of the region. For example, the first visual object may have a size smaller than the size of the region. For example, the first visual object may have the size and shape that can be recognized as an object, unlike the second visual object recognized as a background. However, the disclosure is not limited thereto.

For example, the size of the widget displayed in operation 407 may be the same as the size of the widget displayed in operation 401, may be smaller than the size of the widget displayed in operation 401, or may be larger than the size of the widget displayed in operation 401. For example, the size of the widget displayed in operation 407 may be identified based on the size of the region.

Figure 5:
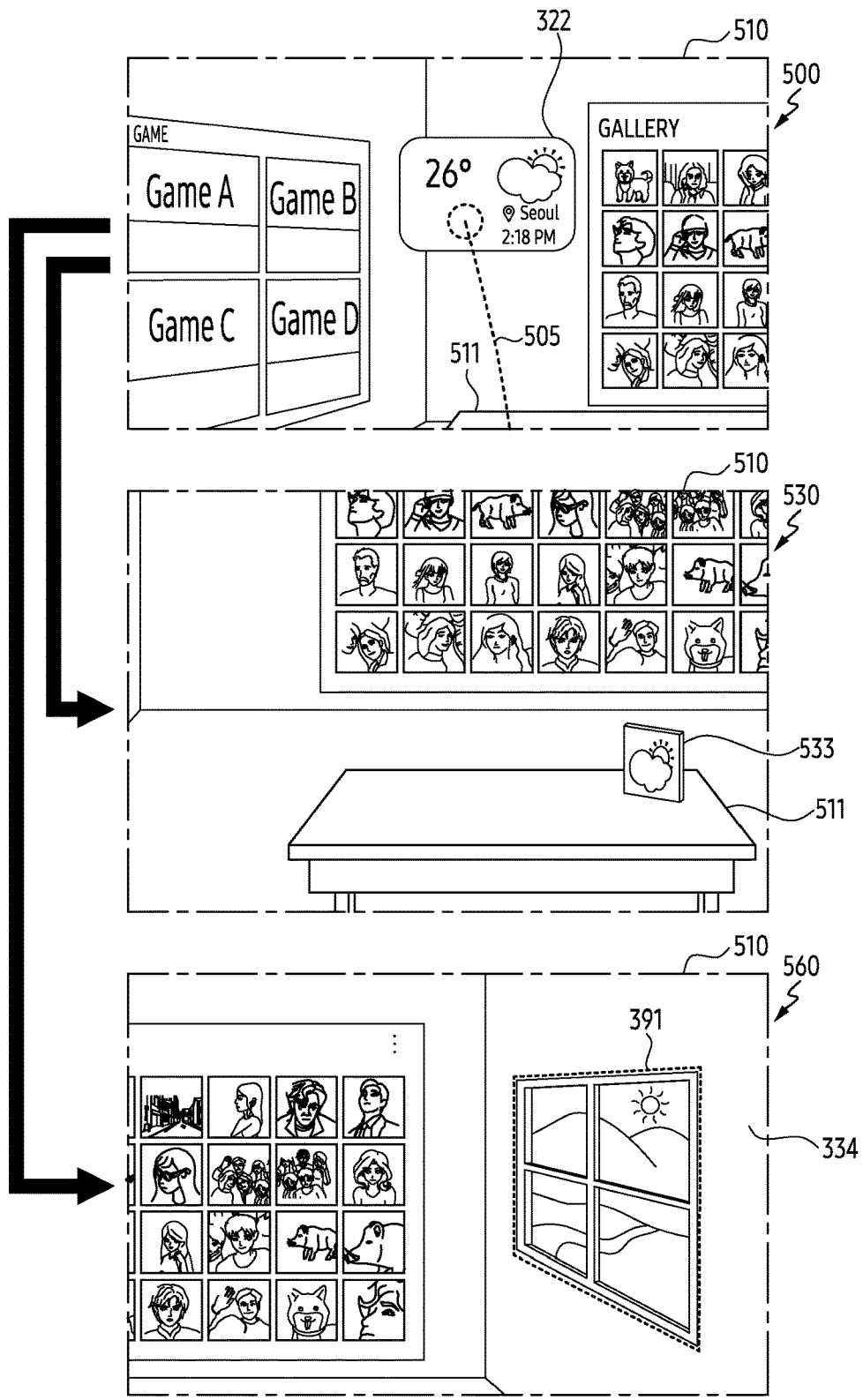
FIG. 5 illustrates an example of a second visual object adaptively displayed according to a direction in which a region to which the widget is to be moved faces, according to an embodiment.

The first visual object displayed in operation 407 may be illustrated in FIG. 5.

FIG. 5 illustrates an example of a second visual object adaptively displayed according to a direction in which a region to which the widget is to be moved faces, according to an embodiment.

Referring to FIG. 5, in a state 500, the processor may display a widget 322 in an image 510 representing the indoor environment in which the wearable device 110 is located. For example, in the state 500, the processor may identify the event that moves the widget 322 to a region formed on a visual object 511 corresponding to an external object (e.g., table) in the indoor environment through a pointer 505. For example, in response to the event, the processor may identify that the region faces the direction different from the reference direction. For example, the processor may change the state 500 to the state 530, in response to the identification.

In a state 530, the processor may display a first visual object 533 located in a portion of the region formed on the visual object 511. For example, the first visual object 533 may have a shape recognized as an object located on the external object in the indoor environment. For example, the first visual object 533 may have a shape such as a desk clock. For example, the first visual object 533 may have a size identified based on the size of the region or the external object.

For example, the first visual object 533 may provide part of the information in a format corresponding to the format of the information for the weather condition, being provided through the widget 322.

For example, the amount of information provided through the first visual object 533 may be identified based on the size of the region or the external object. For example, in the case that the size of the space for the first visual object 533 is smaller than the size of the space for the widget 322, the first visual object 533 may provide less information than the widget 322. For example, unlike widget 322, the first visual object 533 may not include information on the local time and information on the geographic area. However, the disclosure is not limited thereto.

Referring back to FIG. 4, in operation 409, the processor may display the second visual object representing the virtual outdoor environment with the weather condition, in the region in the image, based on identifying that the direction, in which the region to which the widget is to be moved, faces corresponds to the reference direction.

For example, unlike the first visual object, the second visual object may indirectly represent the weather condition. For example, since the second visual object represents the virtual outdoor environment to which the weather condition is applied, the second visual object may indirectly represent the weather condition, as opposed to the first visual object representing the weather condition. For example, since the second visual object indirectly represents the weather condition, the size of the second visual object may be smaller than the size of the first visual object. For example, since the second visual object may be recognized as a background, unlike the first visual object that can be recognized as an object, the size of the second visual object may be smaller than the size of the first visual object. The second visual object may be illustrated with reference to FIG. 5.

Referring to FIG. 5, in the state 500, the processor may identify the event that moves the widget 322 to the region formed on a visual object 334 (shown in the state 560) corresponding to an external object (e.g., the wall) in the indoor environment, through a pointer 505. For example, the processor may identify that the region faces a direction corresponding to the reference direction, in response to the event. For example, the processor may identify the direction in which a plane in the visual object 334 faces, through an image analysis, thereby identifying that the region faces the direction corresponding to the reference direction. For example, the processor may change the state 500 to the state 560, in response to the identification.

In the state 560, the processor may display a second visual object 391 located in at least part of the region formed on visual object 334. For example, the second visual object 391 may represent the virtual outdoor environment with the weather condition. For example, since the second visual object 391 indirectly represents the weather condition through the virtual outdoor environment, the second visual object 391 may have a size larger than that of the first visual object 533. For example, although the second visual object 391 has a size larger than the size of the first visual object 533 to represent the weather condition, the second visual object 391 is located in the background area, so the displaying of the second visual object 391 may provide a space for displaying another virtual object (e.g., another user interface, another widget or another visual object) in the image 510. For example, since the second visual object 391 represents the virtual outdoor environment with the weather condition viewed through the window, the second visual object 391 may provide a sense of homogeneity with respect to the background area in the image 510. For example, the color of the second visual object 391 may be identified based on the color of the region or visual object 334.

For example, the second visual object 391 may be displayed in the image together with a visual effect in order to enhance a sense of homogeneity for the background area of the image provided from the second visual object 391. The visual effect may represent the indoor environment at least partially changed to represent the weather condition. The visual effect may be illustrated with reference to FIG. 6.

Figure 6:
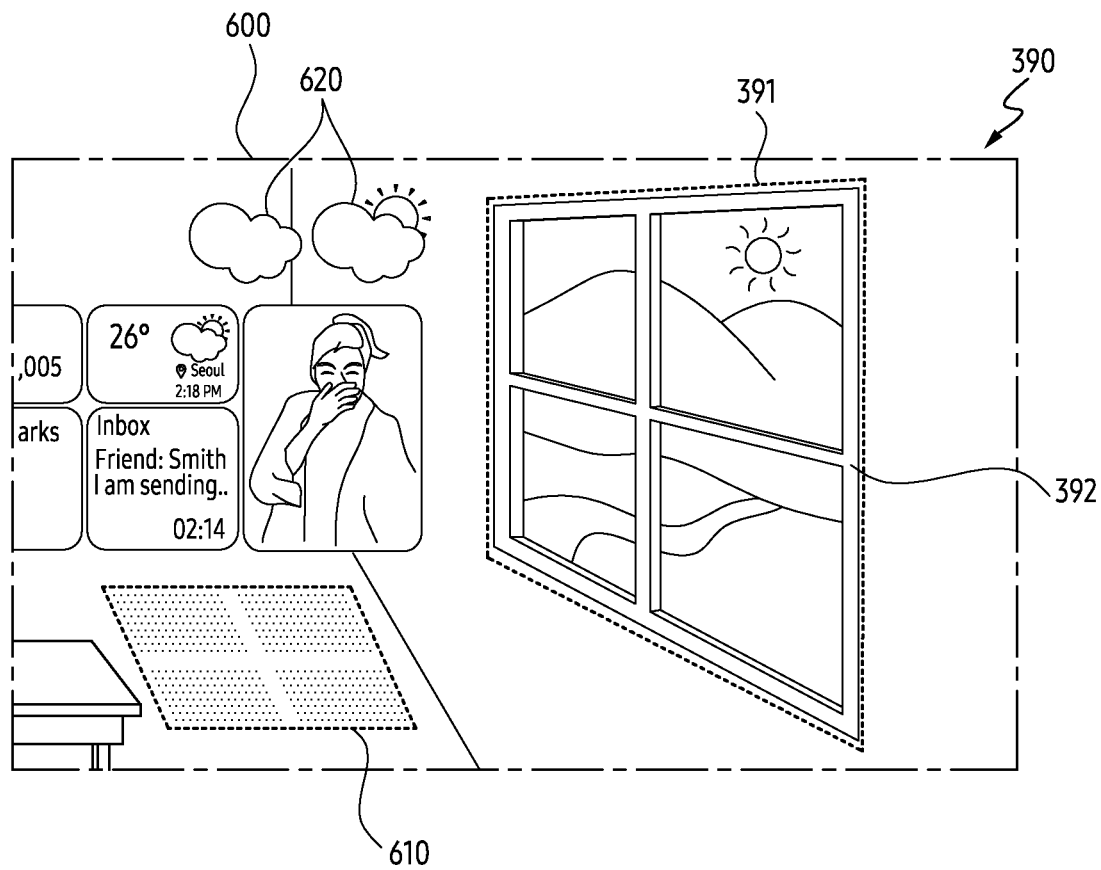
FIG. 6 illustrates an example of a visual effect displayed together with a second visual object, according to an embodiment.

FIG. 6 illustrates an example of a visual effect displayed together with a second visual object, according to an embodiment.

Referring to FIG. 6, the image 600 may include a second visual object 391. For example, the image 600 may further include a visual effect 610 displayed in association with the second visual object 391 (e.g., a region where virtual light transmitted through the window of the second visual object 391 is received and a shadow region thereof). For example, the visual effect 610 may be adjacent to the second visual object 391 in the image 600.

For example, the visual effect 610 may represent the indoor environment that has been at least partially changed to represent the weather condition. For example, the visual effect 610 may at least partially change the color of the indoor environment through processing of the image 600, thereby representing the indoor environment at least partially changed to represent the weather condition. For example, the visual effect 610 may represent the indoor environment at least partially changed to represent the weather condition, by adding at least one new visual element (e.g., a shadow region and a light-received region) into the image 600.

For example, the visual effect 610 may be maintained while the second visual object 391 is displayed. For example, the visual effect 610 may disappear from the image 600 after a predetermined time has elapsed since the second visual object 391 was initially displayed. For example, the visual effect 610 may or may not be displayed in association with the second visual object 391, depending on the amount of operation executed in the wearable device 110 when displaying the second visual object 391. For example, displaying the visual effect 610 may be bypassed, skipped, or refrain from, depending on the amount of the operation in execution.

For example, the visual effect 610 may assist the second visual object 391 so that the weather condition can be better recognized. For example, the visual effect 610 may be provided through animation.

For example, the processor may further display at least one virtual visual object 620 together with the second visual object 391. For example, the at least one virtual visual object 620 may represent the weather condition. For example, the at least one virtual visual object 620 may be maintained while the second visual object 391 is displayed. For example, the at least one virtual visual object 620 may disappear from the image 600 after the predetermined time has elapsed since the second visual object 391 was initially displayed. For example, the at least one virtual visual object 620 may be displayed based on the movement of the widget (e.g., widget 322). For example, in the case that the at least one virtual visual object 620 is displayed according to the movement of the widget, the displaying of the at least one virtual visual object 620 may be stopped, based on the end of the movement of the widget or the change from the widget to the second visual object 391. However, the disclosure is not limited thereto.

Referring back to FIG. 4, the second visual object may further represent not only the weather condition but also the local time (e.g., the current time) of the geographical region where the wearable device 110 is located. For example, the second visual object may represent the local time through the virtual outdoor environment. The second visual object representing the local time may be illustrated with reference to FIG. 7.

Figure 7:
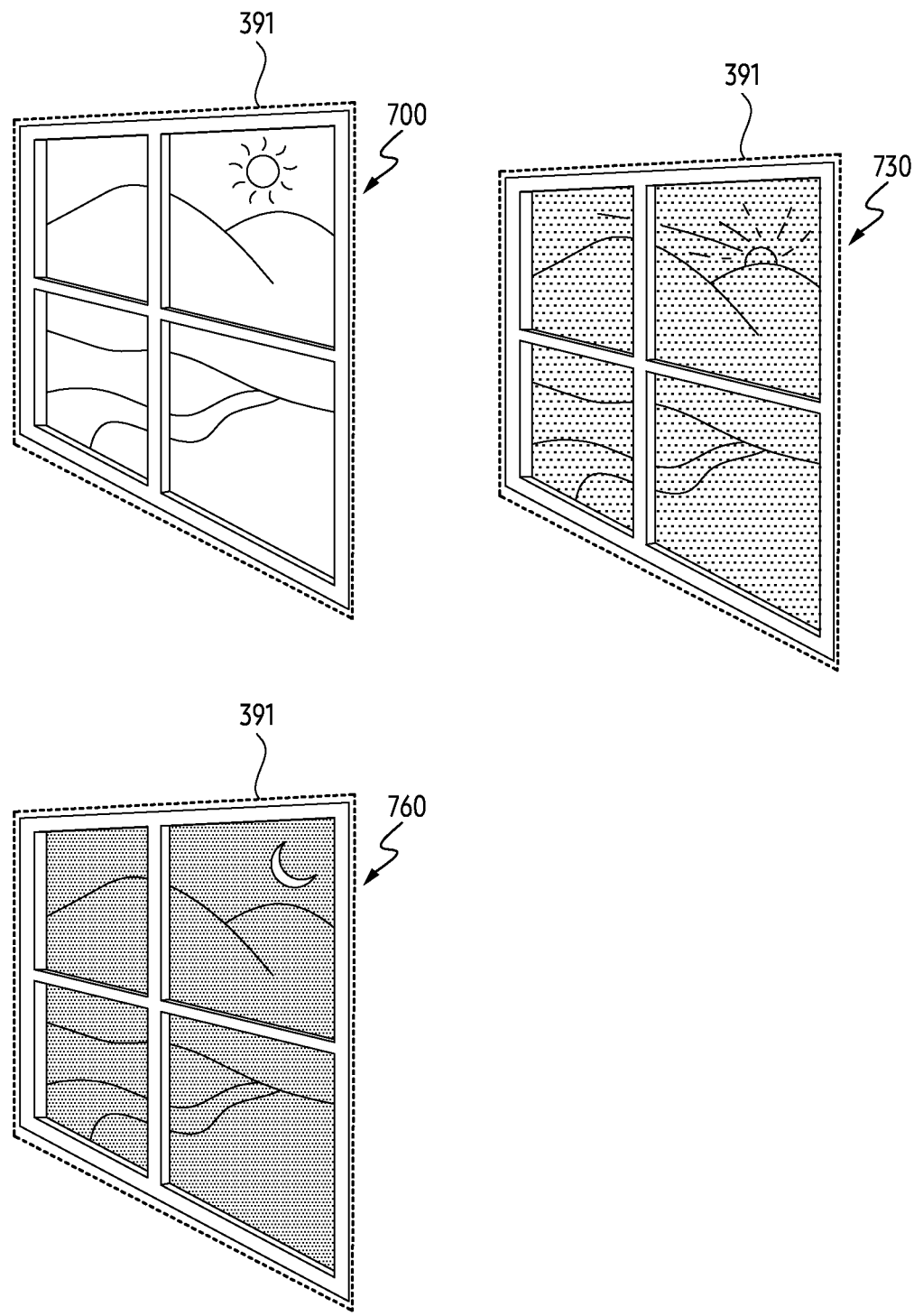
FIG. 7 illustrates an example of a second visual object further representing a local time, according to an embodiment.

FIG. 7 illustrates an example of a second visual object further representing the local time, according to an embodiment.

Referring to FIG. 7, the second visual object 391 may represent that the local time is included in one of a plurality of time bands. For example, the plurality of time bands may include a first time band corresponding to morning, a second time band corresponding to noontime, a third time band corresponding to evening, and a fourth time band corresponding to night.

For example, in the case that the local time is within the first time band, the second visual object 391 may represent a morning scene of the virtual outdoor environment with the weather condition, as in the state 700. For example, in the case that the local time is within the third time band, the second visual object 391 may represent an evening scene of the virtual outdoor environment with the weather condition, as in the state 730. For example, in the case that the local time is within the fourth time band, the second visual object 391 may represent a night scene of the virtual outdoor environment with the weather condition, as in the state 760.

Referring back to FIG. 4, the second visual object may further represent not only the weather condition but also the geographical region where the wearable device 110 is located. For example, the second visual object may display a landmark of the geographic area in the virtual outdoor environment to represent the geographic area. The second visual object representing the geographical region may be illustrated with reference to FIG. 8.

Figure 8:
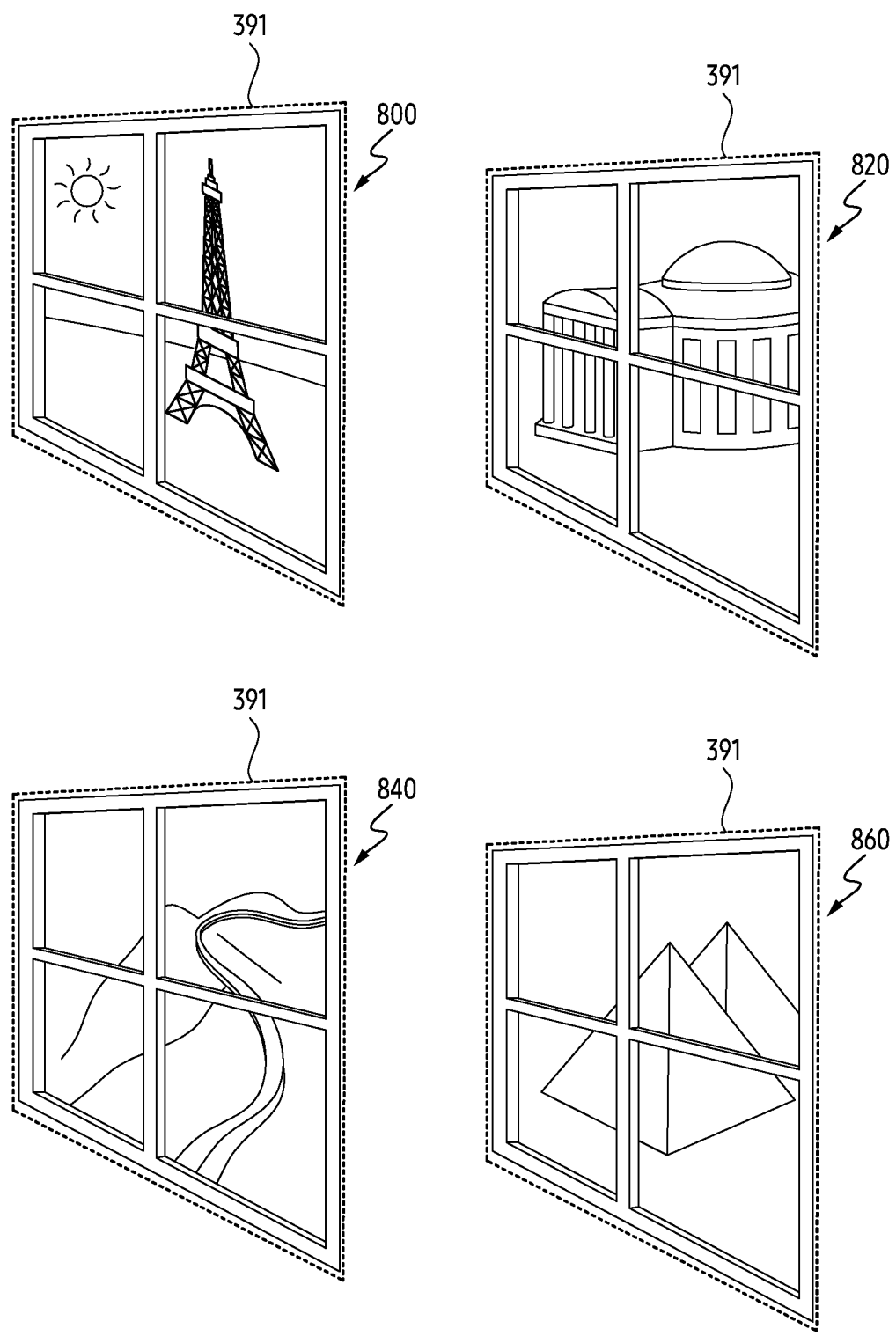
FIG. 8 illustrates an example of a second visual object further representing a geographical region in which a wearable device is located, according to an embodiment.

FIG. 8 illustrates an example of a second visual object further representing a geographical region in which a wearable device is located, according to an embodiment.

Referring to FIG. 8, the second visual object 391 may represent the geographical region through a landmark included in the virtual outdoor environment. For example, the information about the geographic area may be obtained or identified through a communication circuitry included in the wearable device 110 (e.g., a global navigation satellite system (GNSS) receiver, a communication circuit for cellular communication, a communication circuit for Bluetooth low energy (BLE), and/or a communication circuit for Wi-Fi (wireless fidelity)).

For example, in the case that the wearable device 110 is located in France or the weather condition indicates the weather condition of France, the second visual object 391 may represent the virtual outdoor environment, with the weather condition and a visual element corresponding to Eiffel Tower, which is one of the French landmarks, as in the state 800. For example, in the case that the wearable device 110 is located in the United States or the weather condition indicates the weather condition of the United States, the second visual object 391 may represent the virtual outdoor environment, with the weather condition and a visual element corresponding to the White House, which is one of the United States landmarks, as in the state 820. For example, in the case that the wearable device 110 is located in China or the weather condition indicates the weather condition of China, the second visual object 391 may represent the virtual outdoor environment, with the weather condition and a visual element corresponding to the Great Wall, which is one of the Chinese landmarks, as in the state 840. For example, in the case that the wearable device 110 is located in Egypt or the weather condition indicates the weather condition of Egypt, the second visual object 391 may represent the virtual outdoor environment, with the weather condition and a visual element corresponding to a pyramid, which is one of the Egyptian landmarks, as in the state 860.

Referring back to FIG. 4, the processor may output sound signals indicating the weather condition through a speaker of the wearable device 110 or a speaker connected to the wearable device 110 (e.g., a speaker of a smartphone or a Bluetooth speaker), while the second visual object is displayed.

As described above, the wearable device 110 may display the second visual object in an image providing a virtual space, thereby providing the weather condition as a background of the virtual space. For example, the wearable device 110 can enhance space availability of the virtual space, by means of displaying the second visual object. For example, the wearable device 110 may provide an enhanced user experience.

Figure 9:
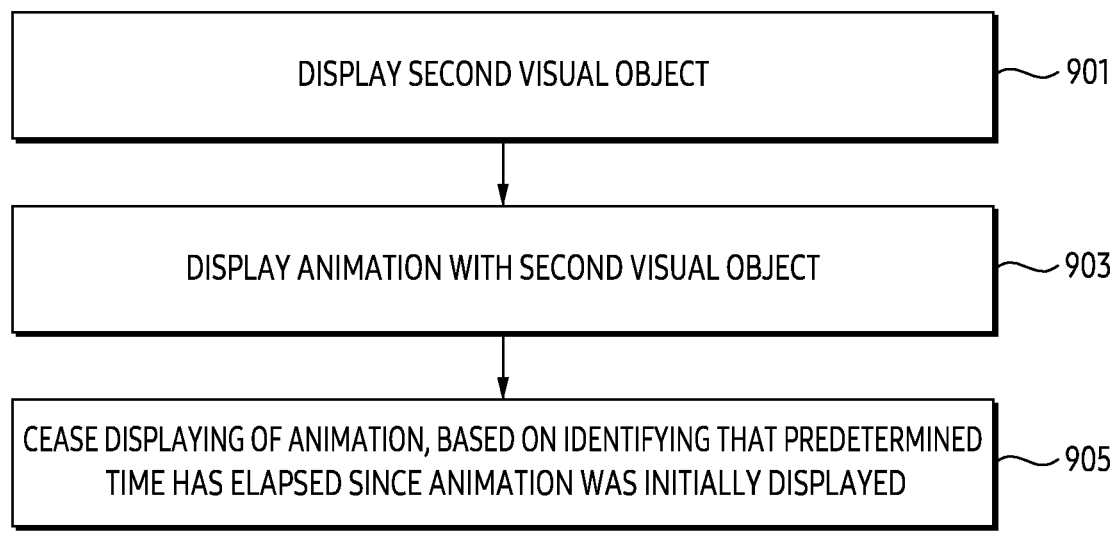
FIG. 9 illustrates an exemplary method of displaying an animation together with a second visual object, according to an embodiment.

FIG. 9 illustrates an exemplary method of displaying an animation together with a second visual object, according to an embodiment. This method may be executed by the wearable device 110 or the processor of the wearable device 110 illustrated in FIG. 1.

Referring to FIG. 9, in operation 901, the processor may display the second visual object. For example, operation 901 may correspond to operation 409 of FIG. 4.

In operation 903, the processor may display an animation together with the second visual object. For example, the displaying of the animation may be executed based on the direction in which the region in the image faces corresponding to the reference direction. For example, the displaying of the animation may be executed based on identifying or determining that the second visual object is displayed.

For example, the animation may represent the indoor environment within the weather condition. For example, when the weather condition is rainy, the animation may represent rain falling in the indoor environment. For example, when the weather condition is snowy, the animation may represent snow falling in the indoor environment. For example, while the animation is provided, a virtual visual element may be further included in the image representing the indoor environment. For example, while the animation representing rain is displayed, the image may further include the virtual visual element representing a state that water is collected due to the rain falling. For example, while the animation representing snow is displayed, the image may further include the virtual visual element representing snow accumulated in the indoor environment.

The animation may be illustrated with reference to FIG. 10.

Figure 10:
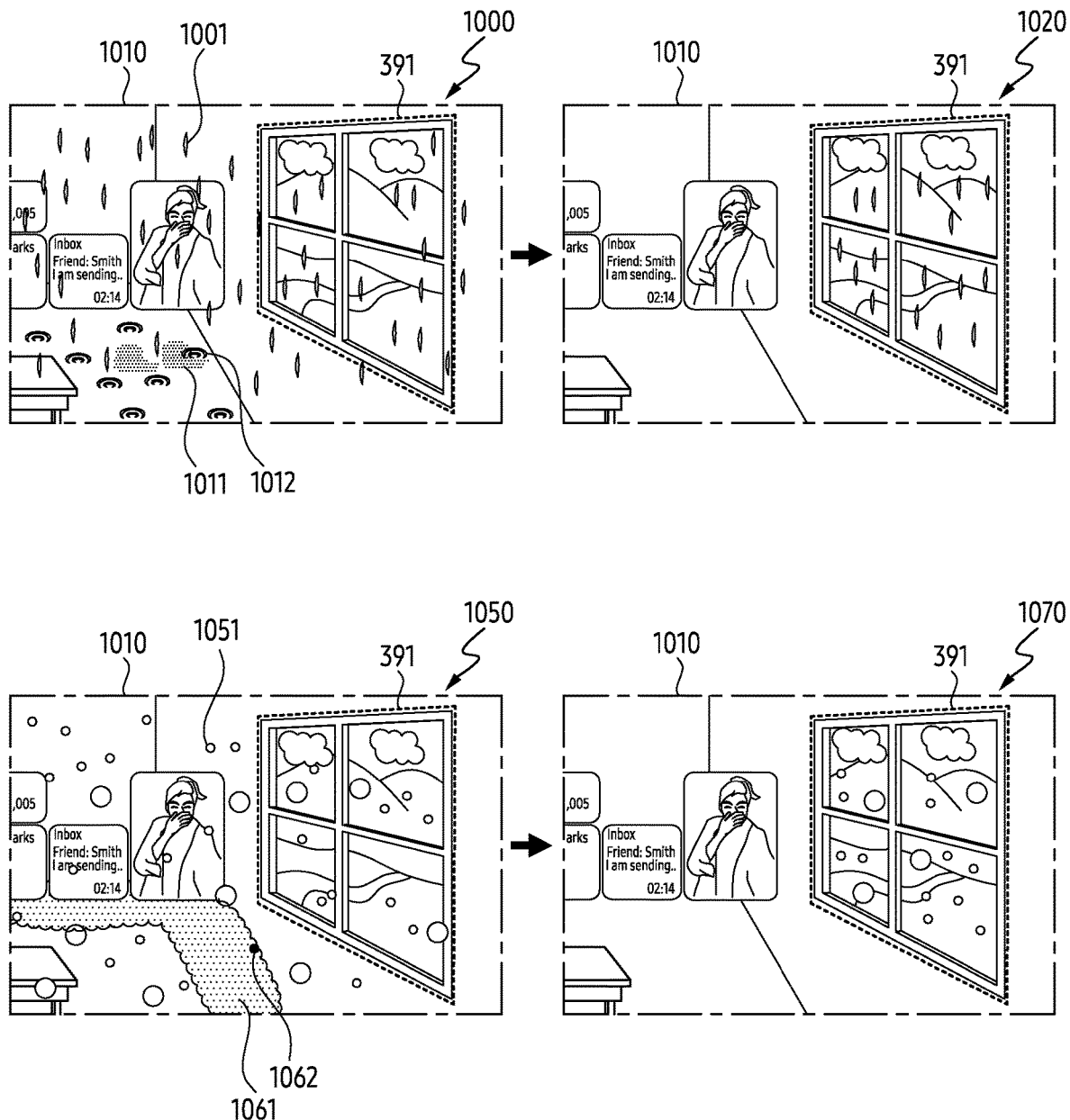
FIG. 10 illustrates an example of an animation displayed together with a second visual object, according to an embodiment.

FIG. 10 illustrates an example of an animation displayed together with a second visual object, according to an embodiment.

Referring to FIG. 10, the processor may display an animation 1001 together with the second visual object 391, as shown in the state 1000. For example, the weather condition represented with the animation 1001 may correspond to the weather condition represented through the second visual object 391. For example, the animation 1001 may be superimposed on the image 1010 representing the indoor environment in which the wearable device 110 is located. For example, animation 1001 may represent the indoor environment having the weather condition together with the image 1010. For example, the processor may further display a virtual visual element 1011 in association with the animation 1001. For example, the virtual visual element 1011 may be included in the image 1010 to represent the indoor environment changed according to the weather condition. For example, the virtual visual element 1011 may represent a state that water is collected due to rain falling. For example, when the virtual visual element 1011 is displayed, a portion 1012 of the animation 1001 may be associated with the virtual visual element 1011, or may extend from the virtual visual element 1011. However, the disclosure is not limited thereto.

For example, the processor may display animation 1051 together with the second visual object 391, as in state 1050. For example, the weather condition represented through animation 1051 may correspond to the weather condition represented through the second visual object 391. For example, the animation 1051 may be superimposed on the image 1010 representing the indoor environment in which the wearable device 110 is located. For example, the animation 1051 may represent the indoor environment with the weather condition together with the image 1010. For example, the processor may further display a virtual visual element 1061 in association with the animation 1051. For example, the virtual visual element 1061 may be included in the image 1010 to represent the indoor environment changed according to the weather condition. For example, the virtual visual element 1061 may represent snow piled up. For example, when the virtual visual element 1061 is displayed, a portion 1062 of the animation 1051 may be associated with or extended from the virtual visual element 1061. However, the disclosure is not limited thereto.

Referring back to FIG. 9, in operation 905, the processor may cease displaying the animation, based on identifying that a predetermined time has elapsed since the animation was initially displayed. For example, the animation is displayed together with the second visual object to visually emphasize the weather condition, but the animation may reduce the quality of other services provided from the virtual space provided through the image. For example, the animation may reduce the visibility of another user interfaces displayed in the image. For example, the animation may be displayed for the predetermined time for the other service. For example, the displaying of the animation may be ceased after the predetermined time has elapse since the other service was initially provided.

An interruption of the displaying of the animation may be illustrated referring to FIG. 10.

Referring to FIG. 10, in the state 1000, the processor may identify whether the predetermined time has elapsed since the display of animation 1001 was initiated. The processor may change the state 1000 to the state 1020, in response to identifying that the predetermined time has elapsed since the display of animation 1001 was initiated. In the state 1020, the processor may cease displaying the animation 1001. In the state 1020, the processor may cease displaying the virtual visual element 1011. Meanwhile, the second visual object 391 displayed together with the animation 1001 may be maintained in the image 1010 even after the predetermined time has elapsed, unlike the animation 1001. For example, since the second visual object 391 is recognized as a background of the image 1010, unlike the animation 1001, the processor may maintain the displaying of the second visual object 391 independently of ceasing the displaying of the animation 1010.

For example, in the state 1050, the processor may identify whether the predetermined time has elapsed since the display of animation 1051 was initiated. The processor may change the state 1050 to the state 1070, in response to identifying that the predetermined time has elapsed since the display of animation 1051 was initiated. In the state 1070, the processor may cease displaying the animation 1051. In the state 1070, the processor may cease displaying the virtual visual element 1061. Meanwhile, the second visual object 391 displayed together with the animation 1051 may be maintained in the image 1010 even after the predetermined time has elapsed, as opposed to the animation 1051. For example, since the second visual object 391 is recognized as a background of the image 1010 unlike the animation 1051, the processor may maintain the displaying of the second visual object 391 independently of ceasing the displaying of the animation 1010.

As described above, the wearable device 110 may display the animation together with the second visual object so that the weather condition is better recognized. For example, the animation may be displayed based on the user's schedule. For example, under the condition that the wearable device 110 recognizes that the current time is approaching the time when the user is going out, the processor may display the animation together with the second visual object.

Figure 11:
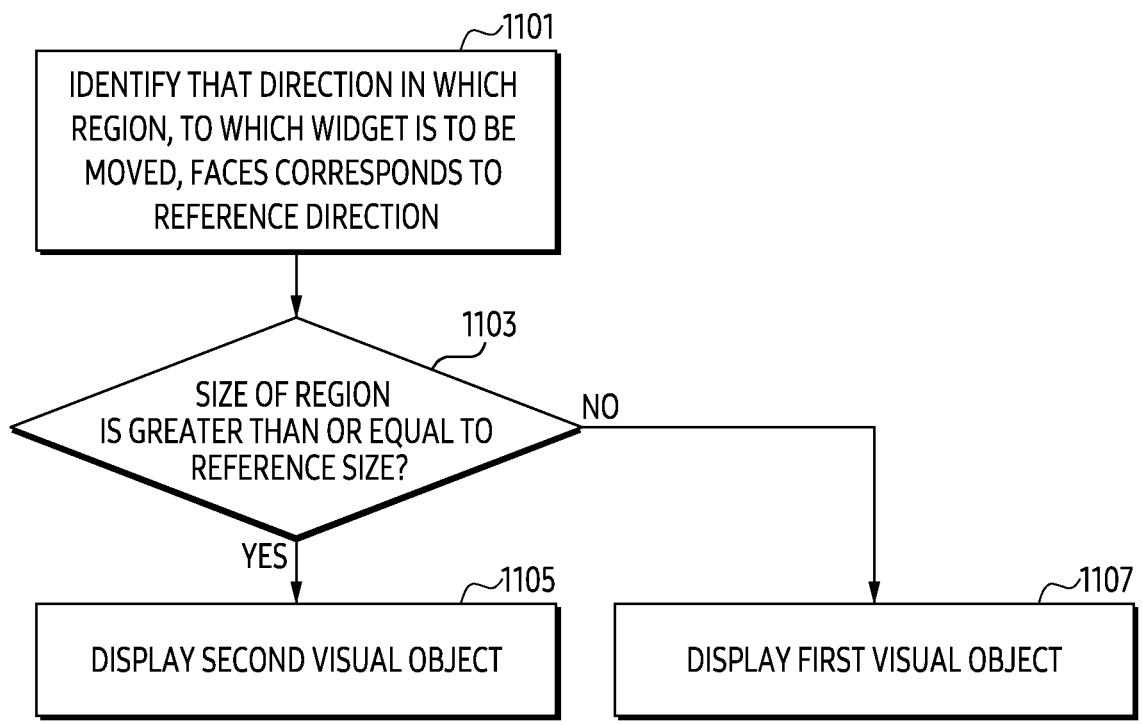
FIG. 11 illustrates an exemplary method of adaptively displaying a second visual object according to a size of a region to which a widget is to be moved, according to an embodiment.

FIG. 11 illustrates an exemplary method of adaptively displaying a second visual object according to a size of a region to which a widget is to be moved, according to an embodiment. This method may be executed by the wearable device 110 or the processor of the wearable device 110 illustrated in FIG. 1.

Referring to FIG. 11, in operation 1101, the processor may identify that the direction in which the region, to which the widget is to be moved, faces corresponds to the reference direction.

In operation 1103, the processor may identify whether the size of the region is greater than or equal to the reference size. For example, since the second visual object represents the virtual outdoor environment with the weather condition, the processor may identify whether the size of the region is greater than or equal to the reference size to identify whether a space for displaying the second visual object exists within the region. For example, the reference size may vary depending on a magnification of the image. For example, the reference size may be a first size in the case that the magnification of the image is a first magnification, and may be a second size smaller than the first size in the case that the magnification of the image is a second magnification higher than the first magnification. However, the disclosure is not limited thereto.

For example, the processor may perform operation 1105 based on the region having the size larger than the reference size, and perform operation 1107 based on the region having the size smaller than the reference size.

In operation 1105, the processor may display the second visual object in the image, based on identifying that the size of the region is greater than or equal to the reference size. The second visual object displayed based on the region having the size greater than or equal to the reference size may be illustrated with reference to FIG. 12.

Figure 12:
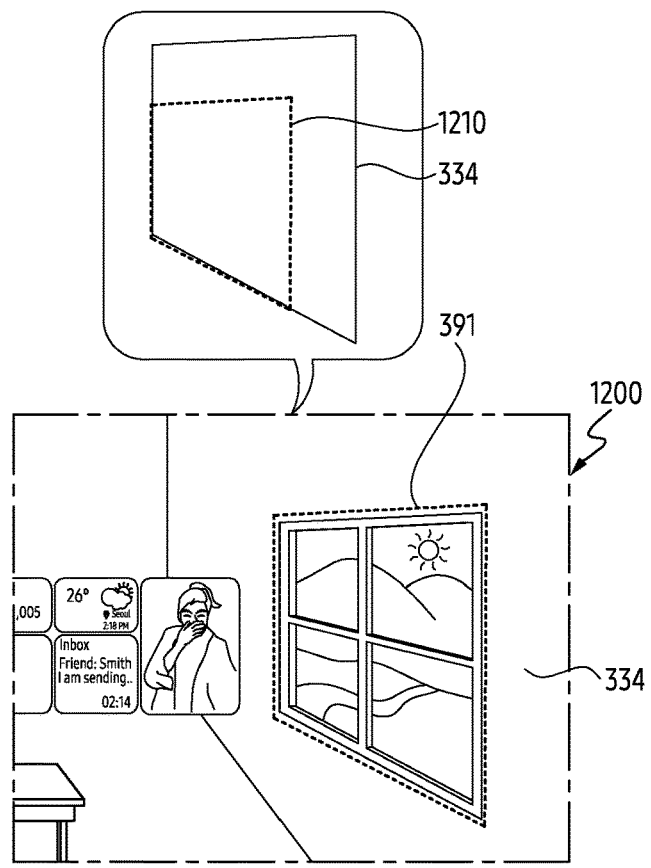
FIG. 12 illustrates an example of a second visual object adaptively displayed according to a size of a region to which the widget is to be moved, according to an embodiment.
Figure 12:
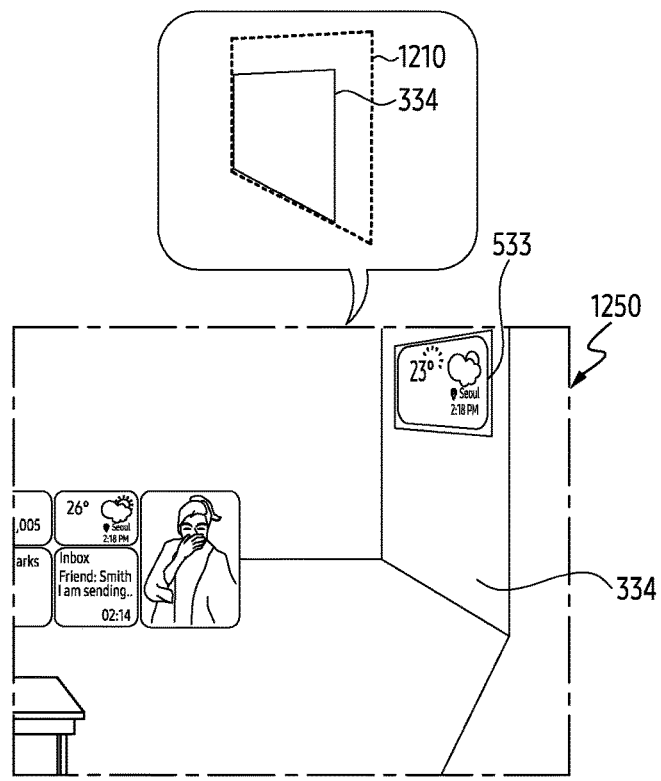

FIG. 12 illustrates an example of a second visual object adaptively displayed according to a size of a region to which a widget is to be moved, according to an embodiment.

Referring to FIG. 12, the processor may provide a state 1200. For example, the processor may provide the state 1200 based on identifying that the size of the visual object 334 providing the region is larger than the reference size 1210. For example, in the state 1200, the processor may display the second visual object 391 changed from the widget (e.g., widget 322) within a visual object 334.

Referring back to FIG. 11, in operation 1107, the processor may display the first visual object in the image, based on identifying that the size of the region is smaller than the reference size. For example, the processor may refrain from changing the widget to the second visual object based on identifying that the size of the region is smaller than the reference size, and may change the widget to the first visual object. For example, the first visual object may include at least part of the information provided through the widget. For example, the size of the first visual object may be smaller than the size of the second visual object. For example, the first visual object may have a shape of an object including the information about the weather condition. The first visual object displayed based on the region having the size smaller than the reference size may be illustrated with reference to FIG. 12.

Referring to FIG. 12, the processor may provide a state 1250. For example, the processor may provide the state 1250, based on identifying that the size of the visual object 334 providing the region is smaller than the reference size 1210. For example, in the state 1250, the processor may display the first visual object 533 changed from the widget (e.g., widget 322) within the visual object 334. For example, unlike the second visual object 391, the first visual object 533 may explicitly represent the weather condition. For example, since the direction in which the visual object 334 faces corresponds to the reference direction, a shape of the first visual object 533 may be different from the shape of the first visual object 533 displayed in the state 530 of FIG. 5. For example, the first visual object 533 may have a shape of an object that can be hung on a wall.

As described above, the wearable device 110 may identify whether to display the second visual object, further based on the size of the region to which the widget is to be moved. The wearable device 110 can enhance the availability of the virtual space provided through the image based on the identification.

Figure 13:
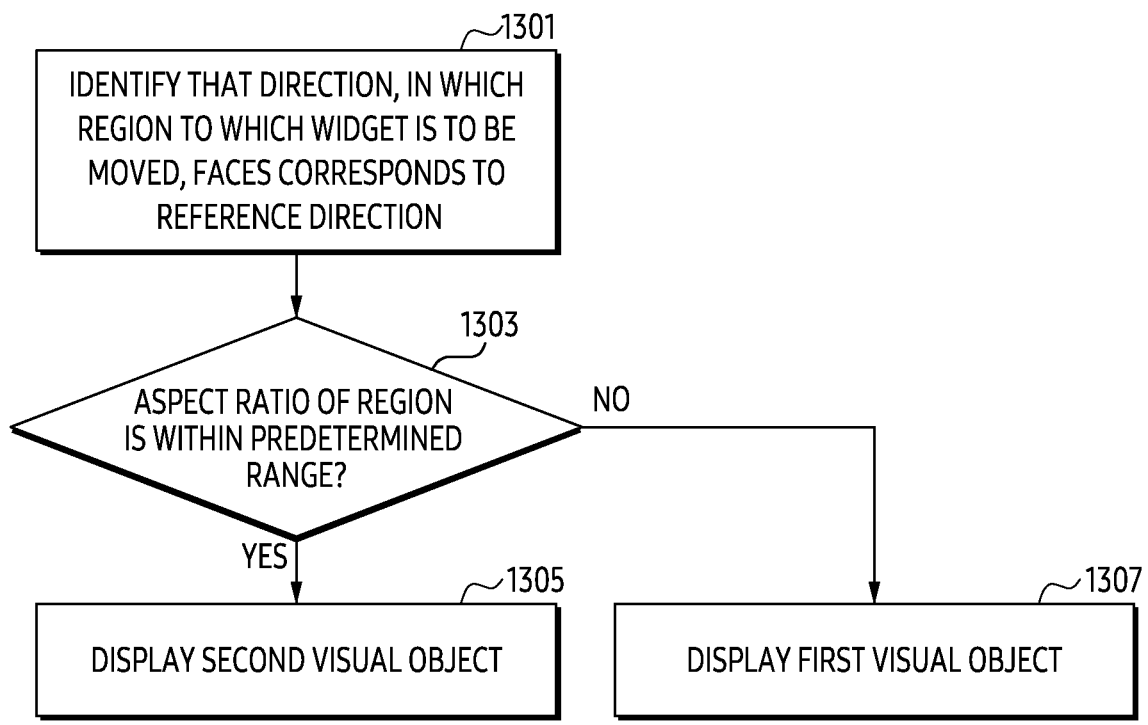
FIG. 13 illustrates an exemplary method of adaptively displaying a second visual object according to an aspect ratio of a region to which a widget is to be moved, according to an embodiment.

FIG. 13 illustrates an exemplary method of adaptively displaying a second visual object according to an aspect ratio of a region to which a widget is to be moved, according to an embodiment. This method may be executed by the wearable device 110 or the processor of the wearable device 110 illustrated in FIG. 1.

Referring to FIG. 13, in operation 1301, the processor may identify that the direction, in which the region to which the widget is to be moved, faces corresponds to the reference direction.

In operation 1303, the processor may identify whether an aspect ratio of the region is within a predetermined range. For example, since the second visual object represents the virtual outdoor environment with the weather condition, the processor may identify whether the aspect ratio is within the predetermined range. For example, since a region having an aspect ratio of 10:1 or 0.1:1 has a bar shape, the second visual object displayed in the region may only represent a part of the virtual outdoor environment with the weather condition. In such a case, since the weather condition may not be recognized, the processor may identify whether the aspect ratio is within the predetermined range.

For example, the processor may execute operation 1305 based on the region with an aspect ratio within the predetermined range, and execute operation 1307 based on the region with an aspect ratio out of the predetermined range.

In operation 1305, the processor may display the second visual object changed from the widget within the image, based on identifying that the aspect ratio is within the predetermined range. The second visual object displayed based on the region having the aspect ratio within the predetermined range may be illustrated with reference to FIG. 14.

Figure 14:
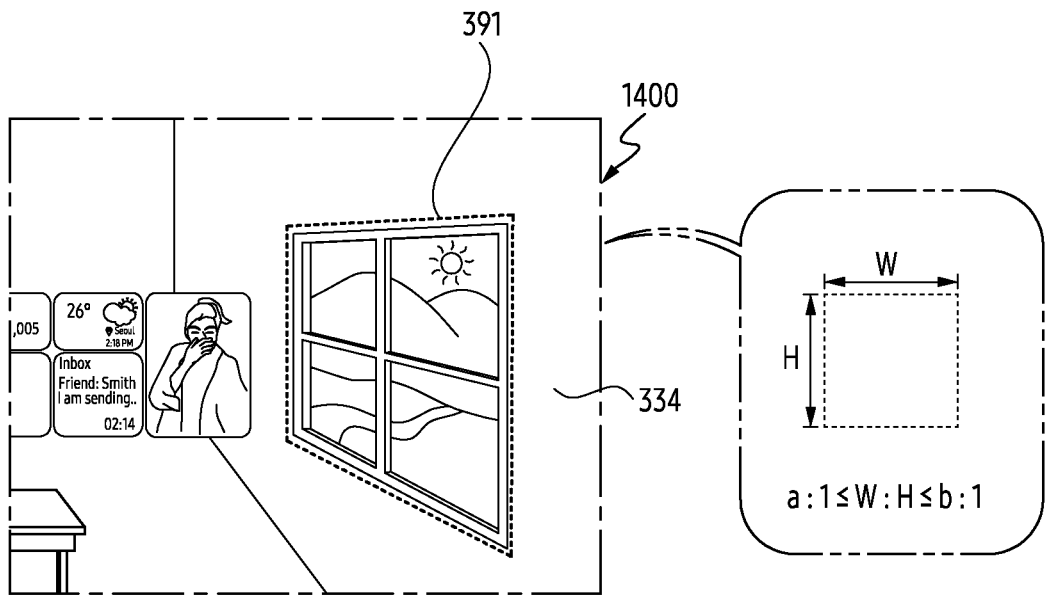
FIG. 14 illustrates an example of a second visual object adaptively displayed according to an aspect ratio of a region to which a widget is to be moved, according to an embodiment.
Figure 14:
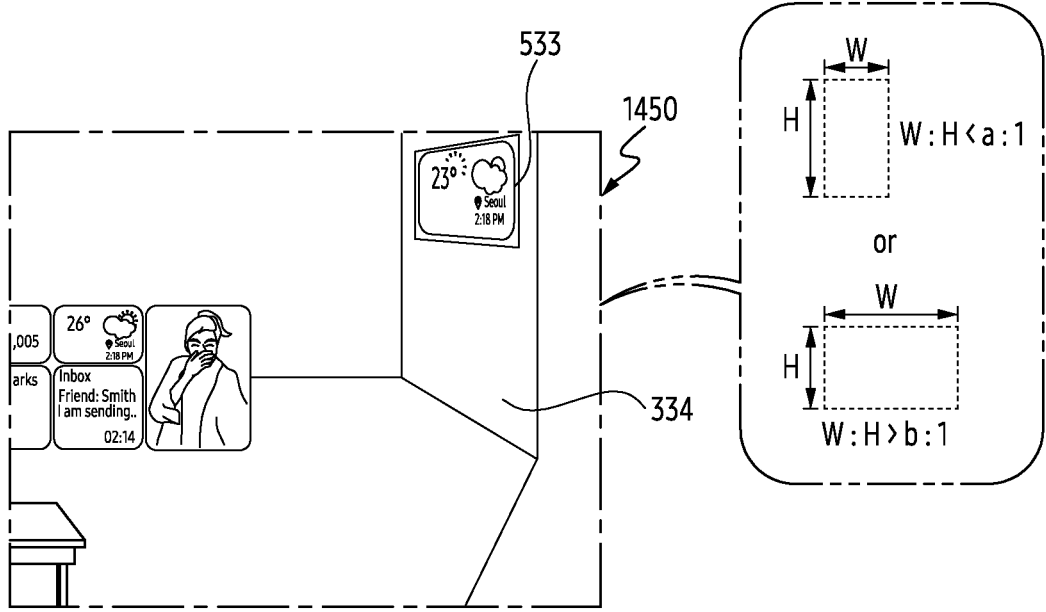

FIG. 14 illustrates an example of a second visual object adaptively displayed according to an aspect ratio of a region to which a widget is to be moved, according to an embodiment.

Referring to FIG. 14, the processor may provide a state 1400. For example, the processor may provide the state 1400 based on identifying that the aspect ratio (W:H) of the visual object 334 providing the region is within the predetermined range (e.g., identifying that the aspect ratio (W:H) is more than or equal to a:1 or less than or equal to b:1). For example, in the state 1400, the processor may display the second visual object 391 changed from the widget (e.g., widget 322) within the visual object 334.

Referring back to FIG. 13, in operation 1307, the processor may display the first visual object changed from the widget within the image, based on identifying that the aspect ratio is out of the predetermined range. For example, based on identifying that the aspect ratio is out of the predetermined range, the processor may refrain from changing the widget to the second visual object and change the widget to the first visual object. For example, displaying the second visual object within the region having the aspect ratio out of the predetermined range may indicate a low probability of recognizing the weather condition, so the processor may display the first visual object in the image. For example, the first visual object may include at least part of the information provided through the widget. For example, the size of the first visual object may be smaller than the size of the second visual object. For example, the first visual object may have a shape of an object including the information about the weather condition. The first visual object displayed based on the region having the aspect ratio out of the predetermined range may be illustrated referring to FIG. 14.

Referring to FIG. 14, the processor may provide a state 1450. For example, the processor may provide the state 1450, based on identifying that the aspect ratio (W:H) of the visual object 334 providing the region is out of the predetermined range (e.g., identifying that the aspect ratio (W:H) is less than a:1 or more than b:1). For example, in the state 1450, the processor may display the first visual object 533 changed from the widget (e.g., widget 322) within the visual object 334. For example, unlike the second visual object 391, the first visual object 533 may explicitly represent the weather condition. For example, since the direction in which the visual object 334 faces corresponds to the reference direction, the shape of the first visual object 533 may be different from the shape of the first visual object 533 displayed in the state 530 of FIG. 5. For example, the first visual object 533 may have a shape of an object that can be hung on a wall.

As described above, the wearable device 110 may identify whether to display the second visual object, further based on an aspect ratio of the region to which the widget is to be moved. The wearable device 110 can enhance the availability of the virtual space provided through the image, based on the identification.

Figure 15:
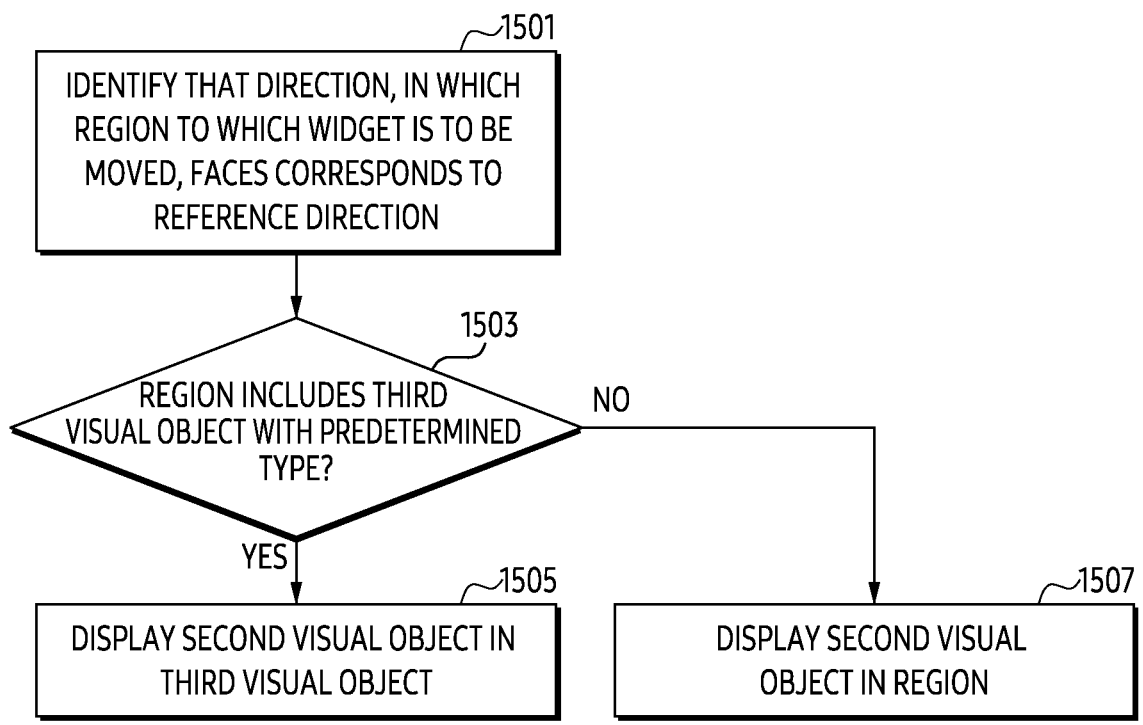
FIG. 15 illustrates an exemplary method of adaptively displaying a second visual object according to whether a region to which a widget is to be moved includes a third visual object of a predetermined type, according to an embodiment.

FIG. 15 illustrates an exemplary method of adaptively displaying a second visual object according to whether a region to which a widget is to be moved includes a third visual object of a predetermined type, according to an embodiment. This method may be executed by the wearable device 110 or the processor of the wearable device 110 illustrated in FIG. 1.

Referring to FIG. 15, in operation 1501, the processor may identify that the direction, in which the region to which the widget is to be moved, faces corresponds to the reference direction.

In operation 1503, the processor may identify whether the region includes a third visual object with a predetermined type. For example, the processor may identify whether the region includes the third visual object in order to identify how to display the second visual object within the region. For example, the processor may identify whether the region includes the third visual object, in order to identify whether the second visual object is displayed in the region as associated with the third visual object or whether the second visual object is displayed in the region in no association with the third visual object.

For example, the third visual object having the predetermined type may be a visual object having a shape capable of providing a space for displaying the second visual object. For example, the third visual object having the predetermined type may be a visual object including a plane facing the direction corresponding to the reference direction. For example, the third visual object having the predetermined type may be a visual object including a frame, such as a mirror or a picture frame. For example, the third visual object having the predetermined type may be a visual object including a display in an inactive state enclosed by a bezel, such as a television or a monitor. However, the disclosure is not limited thereto.

For example, the processor may execute operation 1505 based on the region including the third visual object and execute operation 1507 based on the region not including the third visual object.

In operation 1505, the processor may display the second visual object within the third visual object in the region, based on identifying that the region includes the third visual object. The second visual object displayed within the third visual object may be illustrated with reference to FIG. 16.

Figure 16:
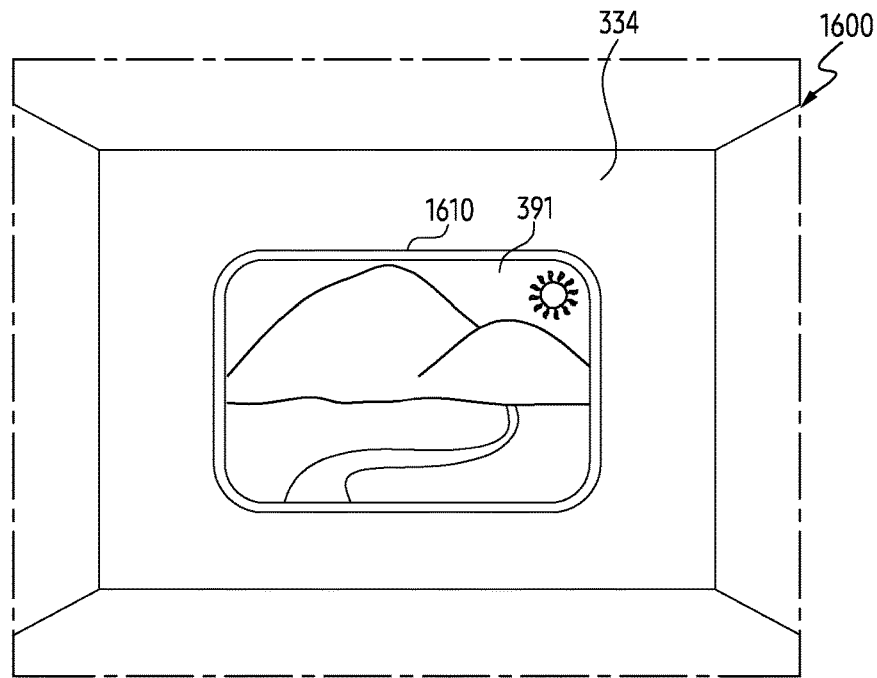
FIG. 16 illustrates an example of a second visual object adaptively displayed according to whether a region to which a widget is to be moved includes a third visual object of a predetermined type, according to an embodiment.
Figure 16:
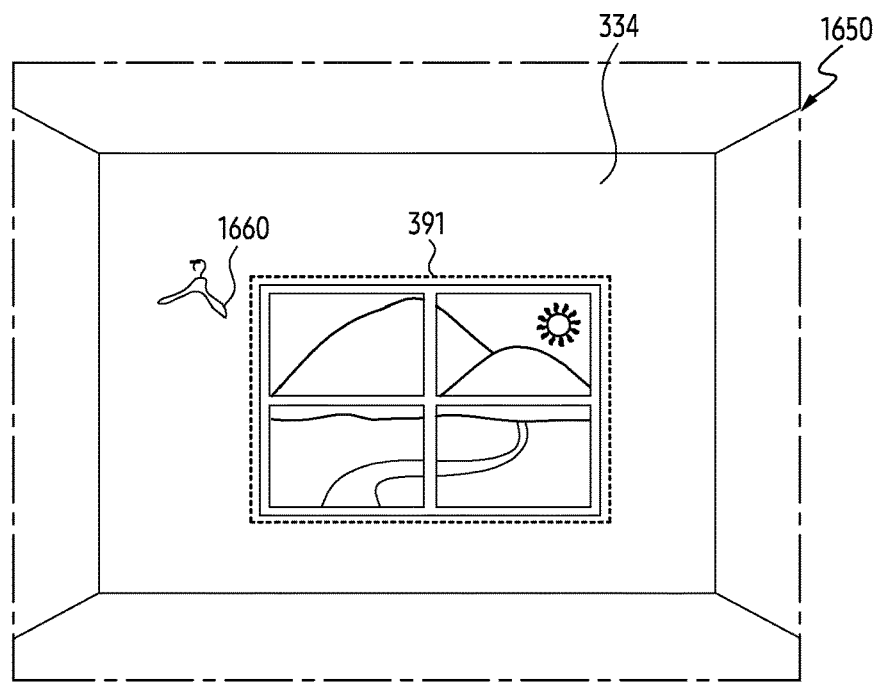

FIG. 16 illustrates an example of a second visual object adaptively displayed according to whether a region to which a widget is to be moved includes a third visual object of a predetermined type, according to an embodiment.

Referring to FIG. 16, the processor may provide a state 1600. For example, the processor may provide the state 1600, based on identifying that the visual object 334 providing the region includes a third visual object 1610 (e.g., a mirror) of the predetermined type. For example, the third visual object 1610 may provide a region in which the second visual object 391 is to be displayed. For example, the third visual object 1610 may have a size capable of representing the virtual outdoor environment with the weather condition, using the second visual object 391. For example, in the state 1600, the second visual object 391 may be displayed within or on the third visual object 1610. For example, in the case that the third visual object 1610 is a visual object providing information in the third visual object 1610, the information may be covered by the second visual object 391. However, the disclosure is not limited thereto.

Referring back to FIG. 15, in operation 1507, the processor may display the second visual object in the region, based on identifying that the region does not include the third visual object. For example, based on identifying that the region includes only a fourth visual object of a different type distinguished from the predetermined type, the processor may display the second visual object within a portion of the region not occupied by the fourth visual object. The displaying of the second visual object may be illustrated with reference to FIG. 16.

Referring to FIG. 16, the processor may provide a state 1650. For example, the processor may provide the state 1650 based on identifying that the visual object 334 providing the region does not include the third visual object of the predetermined type. For example, the processor may provide the state 1650 based on identifying that the visual object 334 includes only a fourth visual object 1660 of other type distinguished from the predetermined type. For example, unlike the third visual object 1610, since the fourth visual object 1660 has a shape that does not provide a space capable of representing the virtual outdoor environment with the weather condition through the second visual object 391, the processor may provide the state 1650. For example, in the state 1650, the second visual object 391 may be displayed within the visual object 334. For example, the second visual object 391 displayed within the visual object 334 may be spaced apart from the fourth visual object 1660 in the visual object 334. For example, the region in the visual object 334 displaying the second visual object 391 may be different from the region in the visual object 334 displaying the fourth visual object 1660. However, the disclosure is not limited thereto.

As described above, the wearable device 110 may display the second visual object as associated with the third visual object, under the condition that the third visual object of the predetermined type is included in the region in which the second visual object is to be displayed, the third visual object capable of being associated with the second visual object. For example, the wearable device 110 can provide an enhanced user experience by displaying the second visual object in association with the third visual object.

Figure 17:
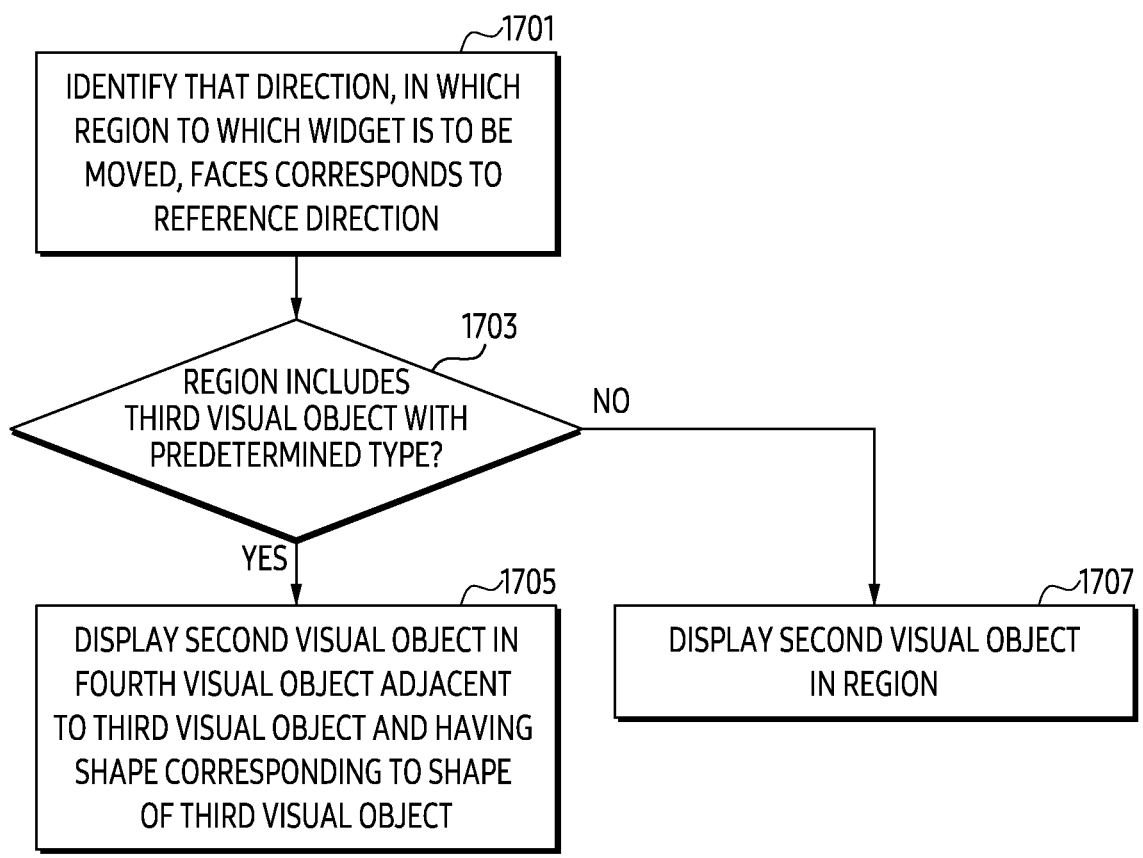
FIG. 17 illustrates an exemplary method of adaptively displaying a second visual object within a fourth visual object according to whether a region to which a widget is to be moved includes a predetermined type of third visual object, according to an embodiment.

FIG. 17 illustrates an exemplary method of adaptively displaying a second visual object within a fourth visual object according to whether a region to which a widget is to be moved includes a predetermined type of third visual object. This method may be executed by the wearable device 110 or the processor of the wearable device 110 illustrated in FIG. 1.

Referring to FIG. 17, in operation 1701, the processor may identify that the direction, in which the region to which the widget is to be moved, faces corresponds to the reference direction.

In operation 1703, the processor may identify whether the region includes a third visual object having a predetermined type. For example, the processor may identify whether the region includes the third visual object, in order to identify how to display the second visual object in the region. For example, the processor may identify whether the region includes the third visual object, in order to identify whether the second visual object is to be displayed within a fourth visual object (e.g., a visual object newly displayed for displaying of the second visual object) in the region displayed as associated with the third visual object.

For example, the third visual object having the predetermined type may be a visual object having a shape capable of providing a space for displaying the second visual object. For example, the third visual object having the predetermined type may be a visual object including a plane facing the direction corresponding to the reference direction. For example, the third visual object having the predetermined type may be a visual object including a frame, such as a mirror or a picture frame. For example, the third visual object may be a visual object having a size smaller than that of the third visual object illustrated with reference to FIGS. 15 and 16. However, the disclosure is not limited thereto.

For example, the fourth visual object may be a virtual object newly added to the image to display the second visual object. For example, the fourth visual object may have a shape corresponding to the shape of the third visual object. However, the disclosure is not limited thereto.

For example, the processor may execute operation 1705 based on the region including the third visual object and execute operation 1707 based on the region not including the third visual object.

In operation 1705, the processor may display the second visual object within the fourth visual object adjacent to the third visual object and having a shape corresponding to the shape of the third visual object, based on identifying that the region includes the third visual object. The second visual object displayed in the fourth visual object may be illustrated with reference to FIG. 18.

Figure 18:
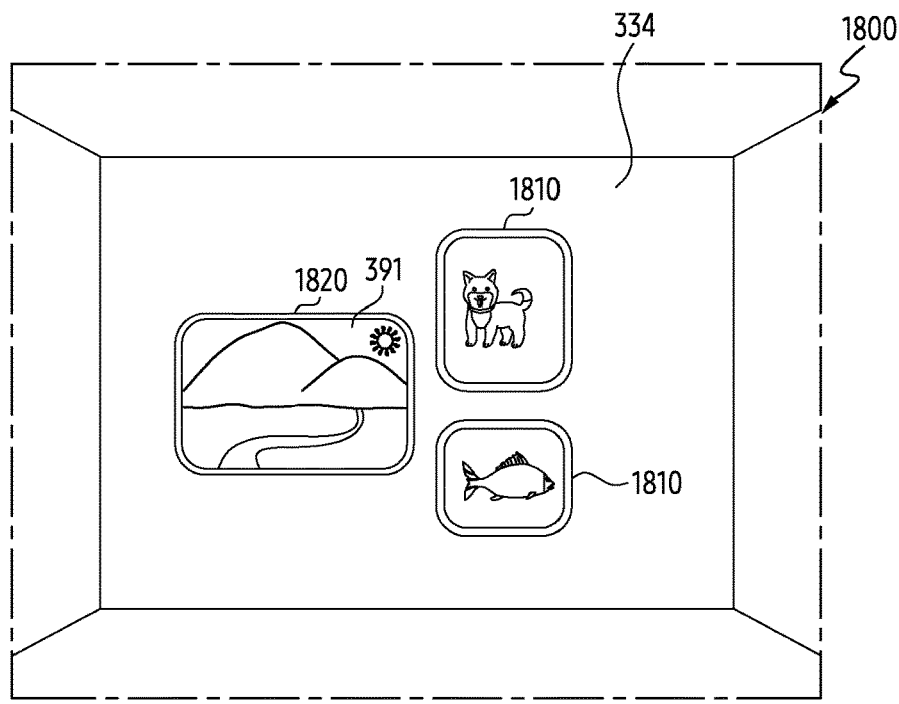
FIG. 18 illustrates an example of a second visual object adaptively displayed within a fourth visual object according to whether a region to which a widget is to be moved includes a third visual object of a predetermined type, according to an embodiment.
Figure 18:
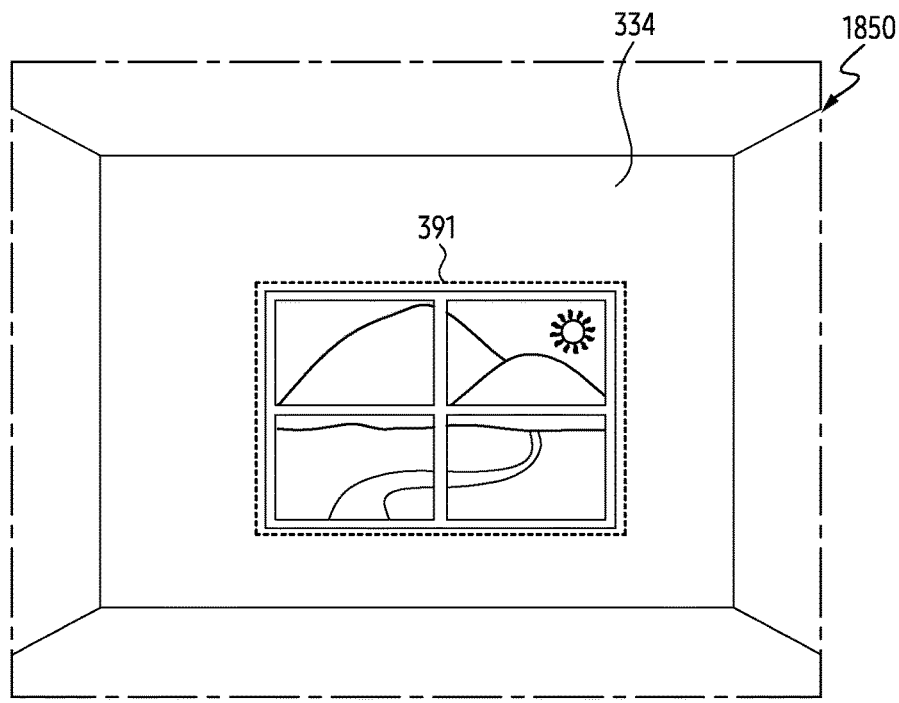

FIG. 18 illustrates an example of a second visual object adaptively displayed in a fourth visual object, depending on whether a region to which a widget is to be moved includes a third visual object of a predetermined type.

Referring to FIG. 18, the processor may provide a state 1800. For example, the processor may provide the state 1800, based on identifying that the visual object 334 providing the region includes at least one third visual object 1810 (e.g., frames) of the predetermined type. For example, based on identifying that the visual object 334 includes at least one third visual object 1810, the processor may obtain a fourth visual object 1820 having a shape corresponding to the shape of the at least one third visual object 1810. For example, a type of the fourth visual object 1820 may correspond to that of the at least one third visual object 1810. For example, the fourth visual object 1820 may be obtained based on obtaining part (e.g., a frame of a picture frame) of the at least one third visual object 1810. However, the disclosure is not limited thereto.

For example, in the state 1800, the processor may display the second visual object 391 within the fourth visual object 1820. For example, the fourth visual object 1820 may be adjacent to at least one third visual object 1810. For example, the fourth visual object 1820 may be displayed in association with the at least one third visual object 1810.

Referring back to FIG. 17, in operation 1707, the processor may display the second visual object in the region, based on identifying that the region does not include the third visual object. The second visual object displayed based on identifying that the region does not include the third visual object may be illustrated with reference to FIG. 18.

Referring to FIG. 18, the processor may provide a state 1850. For example, the processor may provide the state 1850, based on identifying that the visual object 334 providing the region does not include the third visual object of the predetermined type. For example, in the state 1850, the processor may display the second visual object 391 within at least a portion of the region formed by visual object 334. For example, the second visual object 391 may represent the virtual outdoor environment with the weather condition.

As described above, the wearable device 110 may obtain a new visual object according to the type of the visual object included in the region in which the second visual object is to be displayed, and display the second visual object within the obtained visual object. Since the obtained visual object has a shape or a type corresponding to the visual object in the region, the wearable device 110 may display the second visual object having a sense of homogeneity with respect to the region. For example, the wearable device 110 can provide an enhanced user experience.

Figure 19:
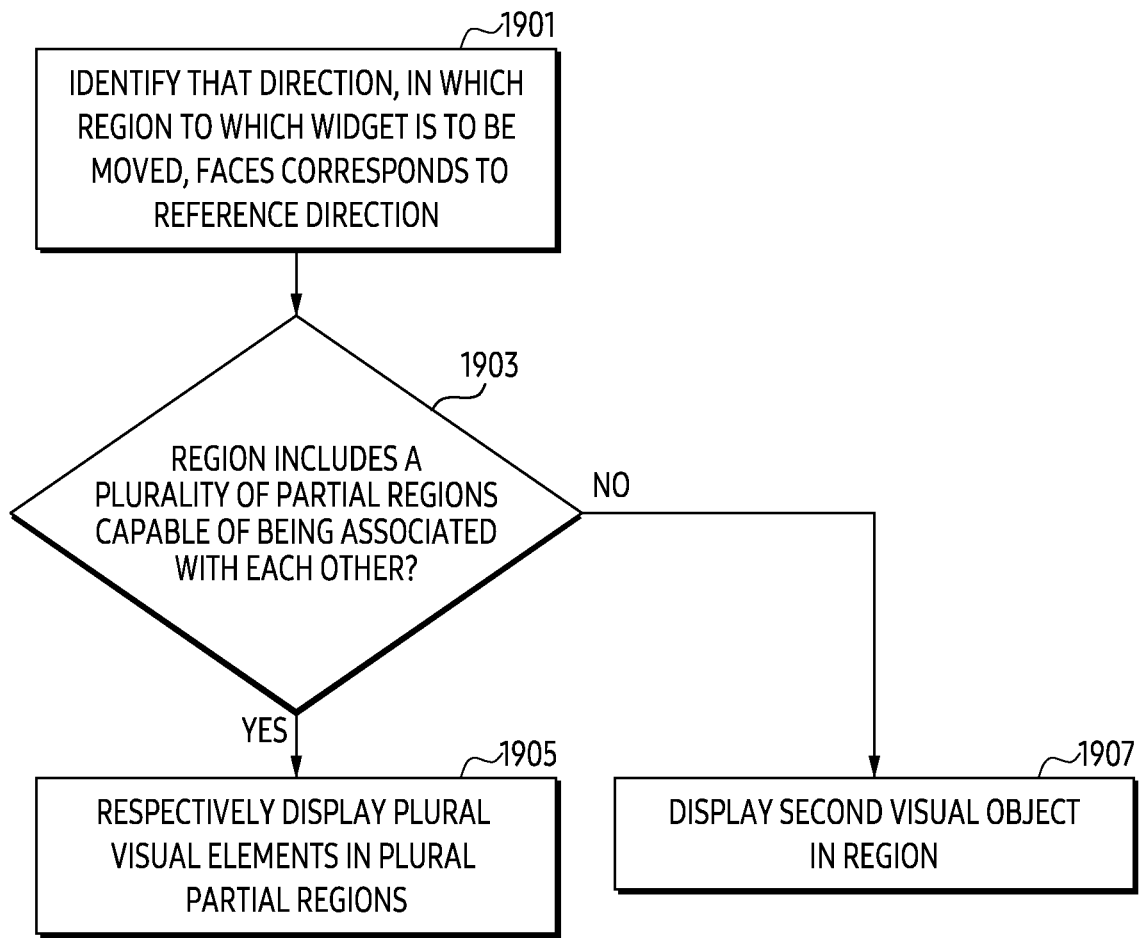
FIG. 19 illustrates an exemplary method of adaptively displaying a second visual object according to whether a region to which a widget is to be moved includes a plurality of partial regions, according to an embodiment.

FIG. 19 illustrates an exemplary method of adaptively displaying a second visual object according to whether a region to which a widget is to be moved includes a plurality of partial regions, according to an embodiment. This method may be executed by the wearable device 110 or the processor of the wearable device 110 illustrated in FIG. 1.

Referring to FIG. 19, in operation 1901, the processor may identify that the direction, in which the region to which the widget is to be moved, faces corresponds to the reference direction.

In operation 1903, the processor may identify whether the region includes a plurality of partial regions capable of being associated with each other. For example, the processor may identify whether the region includes the plurality of partial regions, in order to identify how to display the second visual object in the region. For example, since the size of the second visual object displayed using the plurality of partial regions is larger than the size of the second visual object displayed in a part of the plurality of partial regions and the size of the second visual object displayed in the remaining partial region of the region except for the plurality of partial regions, the processor may identify whether the region includes the plurality of partial regions capable of being associated with each other. For example, the identification may be performed by extracting feature points of the region. For example, the identification may be performed by analyzing peripheries or boundaries included in the region.

For example, the plurality of partial regions being in association with each other may indicate that the plurality of partial regions are adjacent to each other. For example, when the plurality of partial regions are associated with each other, it may indicate that the plurality of partial regions are spaced apart from each other but they are adjacent to each other. However, the disclosure is not limited thereto.

For example, the processor may execute operation 1905 based on the region including the plurality of partial regions capable of being associated with each other, and execute operation 1907 based on the region that does not include the plurality of partial regions capable of being associated with each other.

In operation 1905, the processor may respectively display a plurality of visual elements in which the second visual object is divided, within the plurality of partial regions, based on identifying that the region includes the plurality of partial regions capable of being associated with each other. The plurality of visual elements may be illustrated with reference to FIG. 20.

Figure 20:
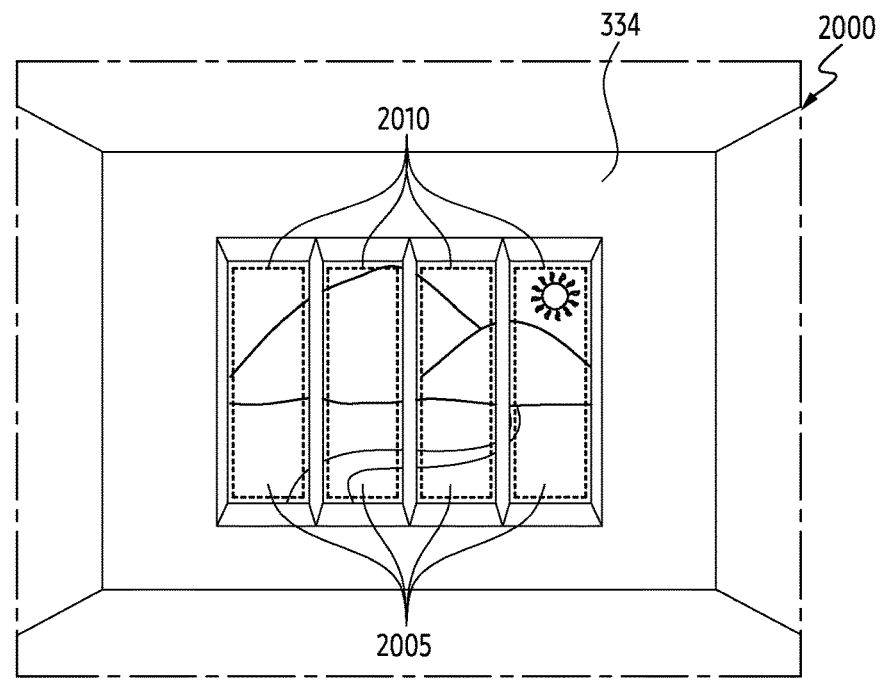
FIG. 20 illustrates an example of a second visual object adaptively displayed according to whether a region to which a widget is to be moved includes a plurality of partial regions, according to an embodiment.
Figure 20:
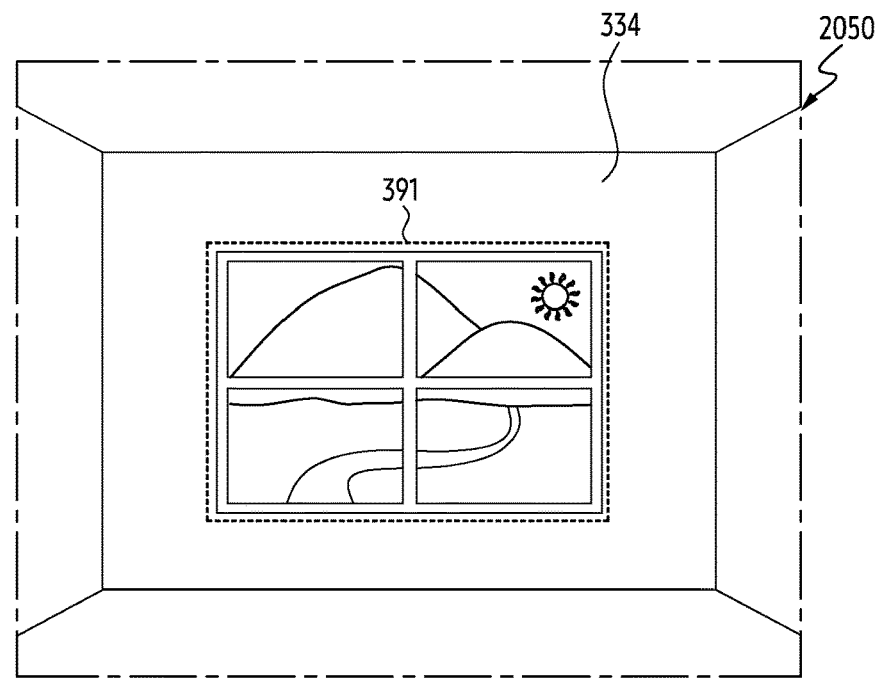

FIG. 20 illustrates an example of a second visual object adaptively displayed according to whether a region to which a widget is to be moved includes a plurality of partial regions, according to an embodiment.

Referring to FIG. 20, the processor may provide a state 2000. For example, the processor may provide the state 2000 based on identifying that the region includes the plurality of partial regions. For example, the processor may provide the state 2000, based on identifying that the visual object 334 providing the region includes a plurality of partial regions 2010 capable of being associated with each other. For example, the plurality of partial regions 2010 may be adjacent to each other and spaced apart from each other. For example, the plurality of partial regions 2010 may have an arrangement capable of displaying continuous visual elements. However, the disclosure is not limited thereto.

For example, in the state 2000, the processor may identify the size of each of a plurality of partial regions 2010, and obtain a plurality of visual elements 2005 from the second visual object 391, based on the size and the arrangement of the plurality of partial regions 2010. For example, each of the plurality of visual elements 2005 may represent a portion of the virtual outdoor environment with the weather condition represented by the second visual object 391. For example, all of the plurality of visual elements 2005 may represent the virtual outdoor environment with the weather condition. For example, the plurality of visual elements 2005 may be continuously displayed in the plurality of partial regions 2010 formed by protrusions of the visual object 334.

Referring back to FIG. 19, in operation 1907, the processor may display the second visual object in the region, based on identifying that the region does not include the plurality of partial areas capable of being associated with each other. The second visual object displayed based on identifying that the region does not include the plurality of partial regions may be illustrated with reference to FIG. 20.

Referring to FIG. 20, the processor may provide a state 2050. For example, the processor may provide the state 2050 based on identifying that the visual object 334 providing the region does not include the plurality of partial regions. For example, in the state 2050, the processor may display the second visual object 391 in at least a part of the region formed by the visual object 334. For example, the second visual object 391 may represent the virtual outdoor environment with the weather condition.

As described above, based on identifying that the region in which the second visual object is to be displayed includes a plurality of partial regions, the wearable device 110 may divide the second visual object into a plurality of visual elements, and display the plurality of visual elements within the plurality of partial regions, respectively. With this displaying, the wearable device 110 may display the second visual object having a sense of homogeneity with respect to the region. For example, the wearable device 110 can provide an enhanced user experience.

Figure 21:
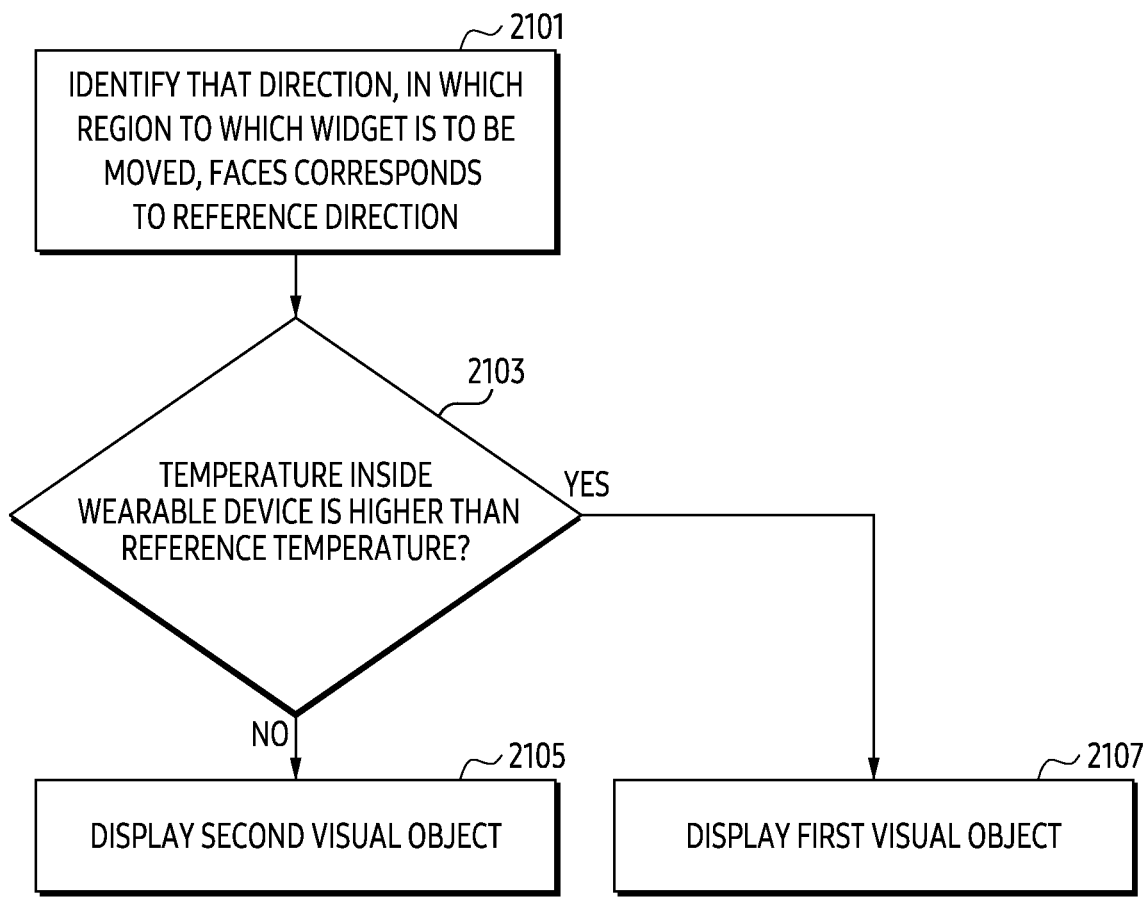
FIG. 21 illustrates an exemplary method of adaptively displaying a second visual object according to a temperature inside a wearable device, according to an embodiment.

FIG. 21 illustrates an exemplary method of adaptively displaying a second visual object according to an internal temperature of a wearable device, according to an embodiment. This method may be executed by the wearable device 110 or the processor of the wearable device 110 illustrated in FIG. 1.

Referring to FIG. 21, in operation 2101, the processor may identify that the direction, in which the region to which the widget is to be moved, faces corresponds to the reference direction.

In operation 2103, the processor may identify whether a temperature inside the wearable device 110 is higher than a reference temperature. For example, an increase in temperature caused by heat generated from the display 120 for displaying the second visual object may be greater than an increase in temperature caused by heat generated from the display 120 for displaying the first visual object. For example, such a difference in temperature increase may be due to the size of the second visual object being larger than the size of the first visual object. For example, the difference in temperature increase may be because the amount of operation of the processor for displaying the second visual object is larger than the amount of operation of the processor for displaying the first visual object. However, the disclosure is not limited thereto. The processor may identify whether the temperature is higher than the reference temperature, in order to reduce damage to the components of the wearable device 110 caused by heat generated by displaying the second visual object.

For example, the processor may execute operation 2105 based on the temperature lower than or equal to the reference temperature, and may execute operation 2107 based on the temperature higher than the reference temperature.

In operation 2105, the processor may display the second visual object, based on identifying that the temperature is lower than or equal to the reference temperature. For example, the temperature being lower than or equal to the reference temperature may indicate that the probability of damage to the components of the wearable device 110 by displaying the second visual object is relatively low, and therefore, the processor may display the second visual object in order to enhance the availability of the virtual space provided by the image obtained through the camera 130.

In operation 2107, the processor may display the first visual object based on identifying that the temperature is higher than the reference temperature. For example, the temperature being higher than the reference temperature may indicate that the probability of damage to the components of the wearable device 110 to be caused by displaying the second visual object is relatively low, and therefore, the processor may refrain from displaying the second visual object and display the first visual object.

Although not shown in FIG. 21, the processor may identify whether the temperature is higher than the reference temperature, while displaying the first visual object. For example, based on identifying that the temperature is lower than or equal to the reference temperature, the processor may cease displaying the first visual object and display the second visual object. However, the disclosure is not limited thereto.

As described above, the wearable device 110 can reduce the probability of damage to the components of the wearable device 110 by adaptively controlling displaying of the second visual object according to the temperature inside the wearable device 110. For example, the wearable device 110 can enhance the availability of the virtual space, while maintaining the stability of the wearable device 110.

Figure 22:
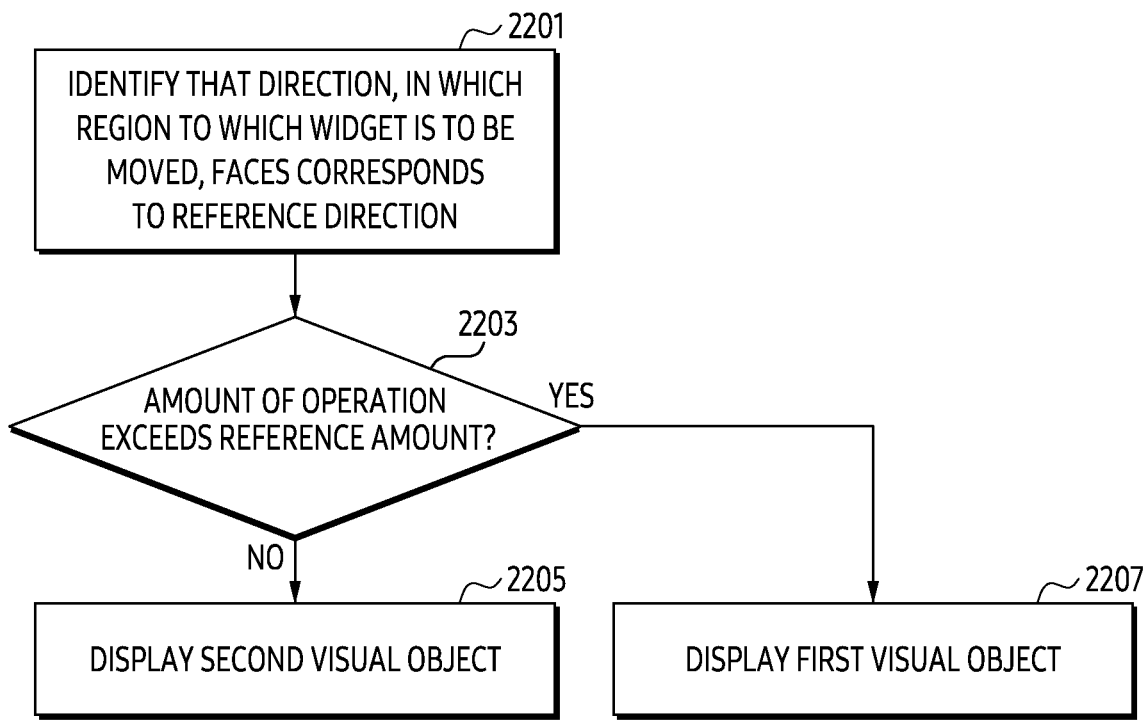
FIG. 22 illustrates an exemplary method of adaptively displaying a second visual object according to an amount of operations executed in a wearable device, according to an embodiment.

FIG. 22 illustrates an exemplary method of adaptively displaying a second visual object according to the amount of operation executed in a wearable device, according to an embodiment. This method may be executed by the wearable device 110 or the processor of the wearable device 110 illustrated in FIG. 1.

Referring to FIG. 22, in operation 2201, the processor may identify that the direction, in which the region to which the widget is to be moved, faces corresponds to the reference direction.

In operation 2203, the processor may identify whether the amount of operation executed in the wearable device 110 exceeds a reference amount. For example, displaying the second visual object when the amount exceeds the reference amount may indicate that the probability of any error to be caused in operation of the components of the wearable device 110 is relatively high, so the processor may identify whether the amount exceeds the reference amount. Since the load for displaying the second visual object is greater than the load for displaying the first visual object, the processor may perform the identification.

For example, the processor may execute operation 2205 based on the amount less than or equal to the reference amount and may execute operation 2207 based on the amount greater than the reference amount.

In operation 2205, the processor may display the second visual object based on identifying that the amount is less than or equal to the reference amount. For example, when the amount is less than or equal to the reference amount, it may indicate that the probability of any error to be caused in operation of the components of the wearable device 110 by displaying of the second visual object is a relatively low, and therefore, the processor may display the second visual object in order to enhance the availability of the virtual space provided by the image obtained through the camera 130.

In operation 2207, the processor may display the first visual object based on identifying that the amount exceeds the reference amount. For example, when the amount exceeds the reference amount, it may indicate that the probability of any error to be caused in operation of the components of the wearable device 110 by displaying of the second visual object is a relatively high, and therefore, the processor may refrain from displaying the second visual object and display the first visual object.

Although not shown in FIG. 22, the processor may identify whether the amount decreases below the reference amount, while displaying the first visual object. For example, based on identifying that the amount decreases below the reference amount, the processor may cease displaying the first visual object and display the second visual object. However, the disclosure is not limited thereto.

As described above, the wearable device 110 may reduce the probability of causing an error in operation of the components of the wearable device 110, by adaptively controlling displaying of the second visual object according to the amount of operation executed in the wearable device 110. For example, the wearable device 110 can enhance the availability of the virtual space, while maintaining the stability of the wearable device 110.

Figure 23:
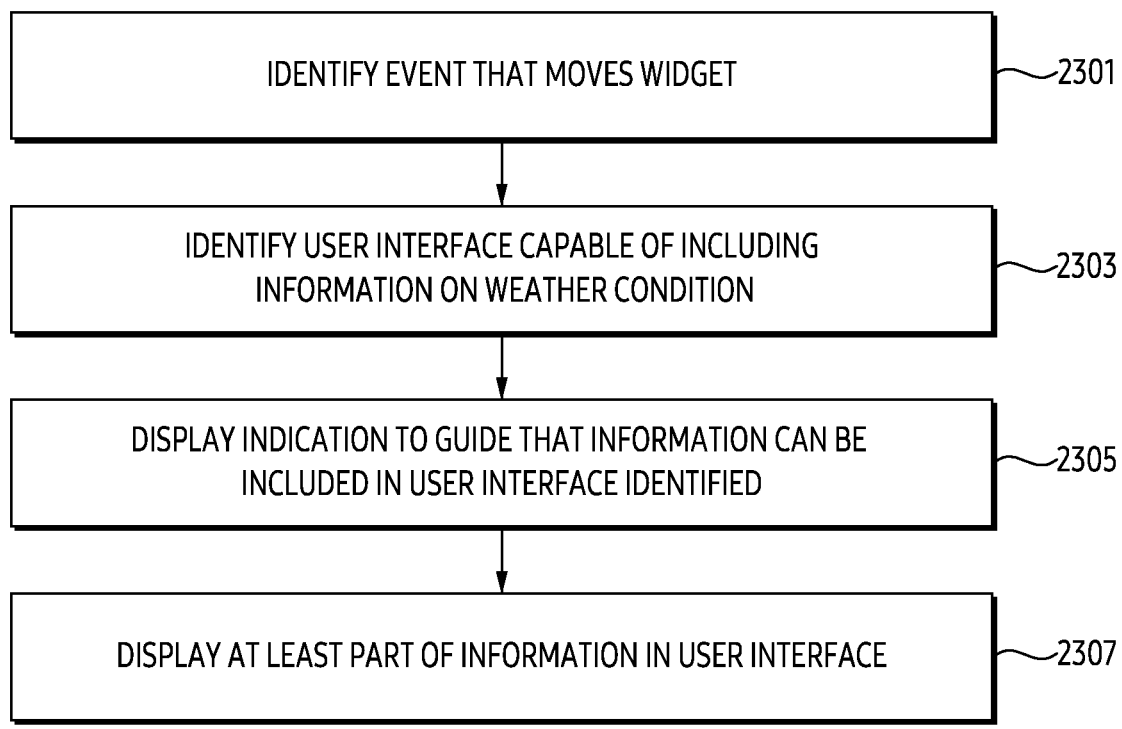
FIG. 23 illustrates an exemplary method of displaying information on a weather condition in another user interface, according to an embodiment.

FIG. 23 illustrates an exemplary method of displaying information on a weather condition in another user interface, according to an embodiment. This method may be executed by the wearable device 110 or the processor of the wearable device 110 illustrated in FIG. 1.

Referring to FIG. 23, in operation 2301, the processor may identify an event that moves a widget including information on the weather condition. For example, the event may include receiving a user input moving the widget. For example, the processor may identify that the widget is moved over the user interface based on the user input.

In operation 2303, the processor may identify the user interface (or another widget) that can include the information about the weather condition, based on the identification. For example, the processor may identify that the user interface located underneath (or within) a path through which the widget is moved according to the event may include the information. For example, the user interface may be a user interface having a space for displaying the information. For example, the user interface may have an empty space in another region distinguished from a region that displays at least one content for a service provided through the user interface. However, the disclosure is not limited thereto. For example, the user interface may be a user interface predefined to include the information.

In operation 2305, the processor may display an indication (or message) to guide that the information can be displayed in the identified user interface. The indication may be illustrated with reference to FIG. 24.

Figure 24:
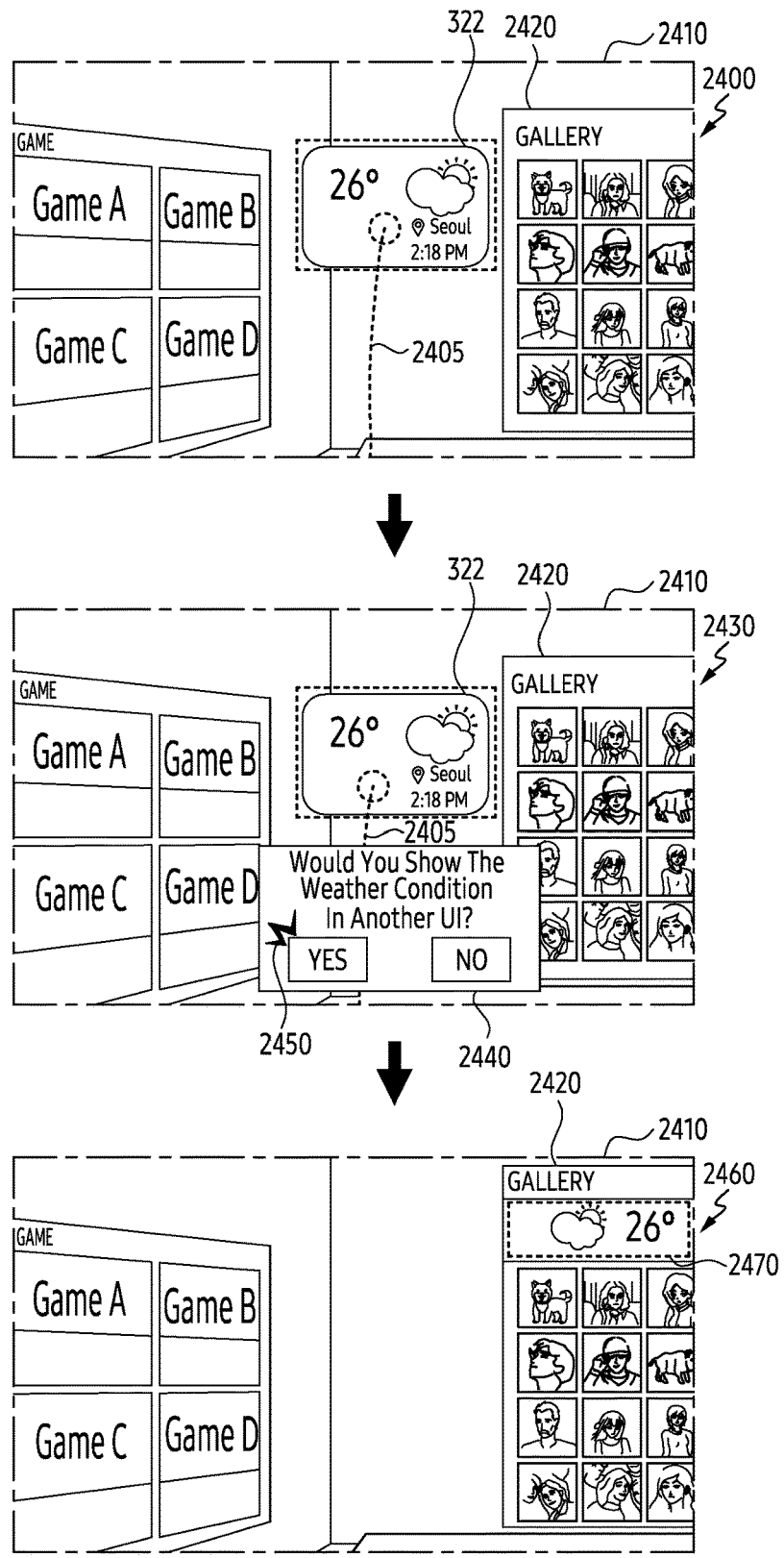
FIG. 24 illustrates an example of information on a weather condition displayed in another user interface, according to an embodiment.

FIG. 24 illustrates an example of information about a weather condition displayed in another user interface, according to an embodiment.

Referring to FIG. 24, in a state 2400, the processor may display a user interface 2420 together with the widget 322, in the image 2410 representing an indoor environment. For example, in the state 2400, the processor may receive a user input moving the widget 322 through a pointer 2405. For example, the processor may identify that the widget 322 moved through the pointer 2405 according to the user input faces the user interface 2420. The processor may change the state 2400 to the state 2430 in response to the identification.

In the state 2430, the processor may display an indication 2440 superimposed on the image 2410. For example, the indication 2440 may inform or guide that the information about the weather condition included in the widget 322 can be indicated in the user interface 2420. For example, the indication 2440 may be displayed, unlike the user's intention moving the widget 322 to the region facing the direction corresponding to the reference direction, through pointer 2405. For example, the indication 2440 may be displayed in response to identifying that the widget 322 is adjacent to the user interface 2420, the widget 322 faces the user interface 2420, or the widget 322 is moved onto the user interface 2420. However, the disclosure is not limited thereto.

Referring back to FIG. 23, in operation 2307, the processor may display at least part of the information in the user interface, in response to receiving a user input indicating that the information is included in the user interface, through the indication. For example, the at least part of the information may be displayed in an empty space within the user interface. The at least part of the information displayed in the user interface may be illustrated with reference to FIG. 24.

Referring to FIG. 24, in the state 2430, the processor may receive a user input 2450 indicating that the information is included in the user interface 2420, through the indication 2440. The processor may change the state 2430 to the state 2460, in response to the user input 2450. For example, in the state 2460, the processor may display at least part of the information 2470 provided through the widget 322, in user interface 2420. For example, the at least part of the information 2470 may be displayed in an empty space of the user interface 2420.

As described above, the wearable device 110 may display the information that had provided through the widget, in a user interface distinguished from the widget, in order to enhance the availability of the virtual space. For example, the wearable device 110 may display at least part of the information on an empty space of the user interface so that the information may be recognized as being included in the user interface. For example, the wearable device 110 may display at least part of the information in an empty space of the user interface, by providing the at least part of the information to a software application providing the user interface.

Figure 25:
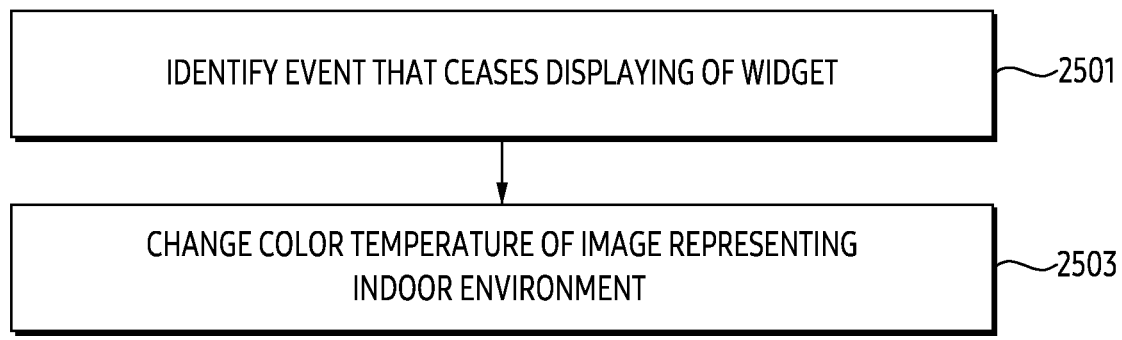
FIG. 25 illustrates an exemplary method of changing a color temperature of an image representing an indoor environment based on a weather condition, according to an embodiment.

FIG. 25 illustrates an exemplary method of changing a color temperature of an image representing an indoor environment based on a weather condition, according to an embodiment. This method may be executed by the wearable device 110 or the processor of the wearable device 110 illustrated in FIG. 1.

Referring to FIG. 25, in operation 2501, the processor may identify an event that ceases displaying of the widget including information on the weather condition, in the image representing the indoor environment.

In operation 2503, the processor may change the color temperature of the image representing the indoor environment, in response to the event. For example, even if displaying of the widget is stopped, the processor may change the color temperature in order to indicate the weather condition through the image. For example, in the case that the weather condition indicates warmth, the processor may reduce the color temperature of the image. For example, according to the reduced color temperature, the color of the image may be changed to a reddish color. For example, in the case that the weather condition indicates cold, the processor may increase the color temperature of the image. For example, according to the increased color temperature, the color of the image may be changed to a bluish color. The change in color temperature may be illustrated with reference to FIG. 26.

Figure 26:
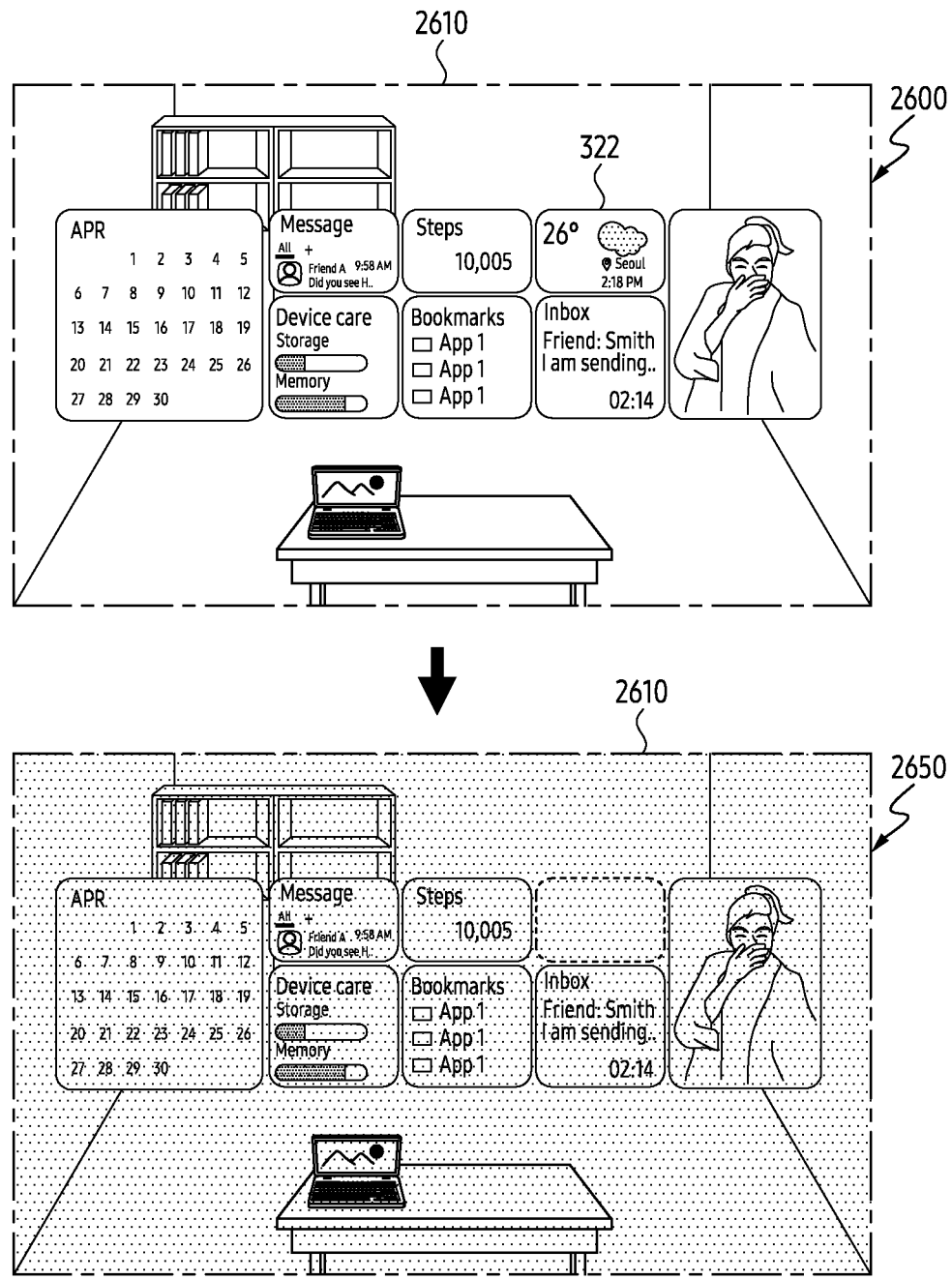
FIG. 26 illustrates an example of an image with a color temperature identified based on a weather condition, according to an embodiment.

FIG. 26 illustrates an example of an image having a color temperature identified based on a weather condition, according to an embodiment.

Referring to FIG. 26, in a state 2600, the processor may display a widget 322 including information on the weather condition, within an image 2610 representing an indoor environment. For example, in the state 2600, the processor may identify an event that ceases displaying of the widget 322. For example, the processor may change the state 2600 to the state 2650 in response to the event. For example, in the state 2650, the processor may display the image 2610 having a changed color based on changing the color temperature. For example, the state 2650 may be provided by displaying a transparent (or translucent) layer with a color corresponding to the weather condition, on the image 2610. For example, in the state 2650, in the case that the weather condition indicates warmth, the image 2610 may be reddish, and in the case that the weather condition indicates cold, the image 2610 may be bluish.

As described above, the wearable device 110 may change the color temperature of the image, under the condition that displaying of the widget providing the information on the weather condition is ceased. The wearable device 110 may represent the weather condition without the widget, through such a change in color temperature. For example, the wearable device 110 can provide an enhanced user experience.

Figure 27:
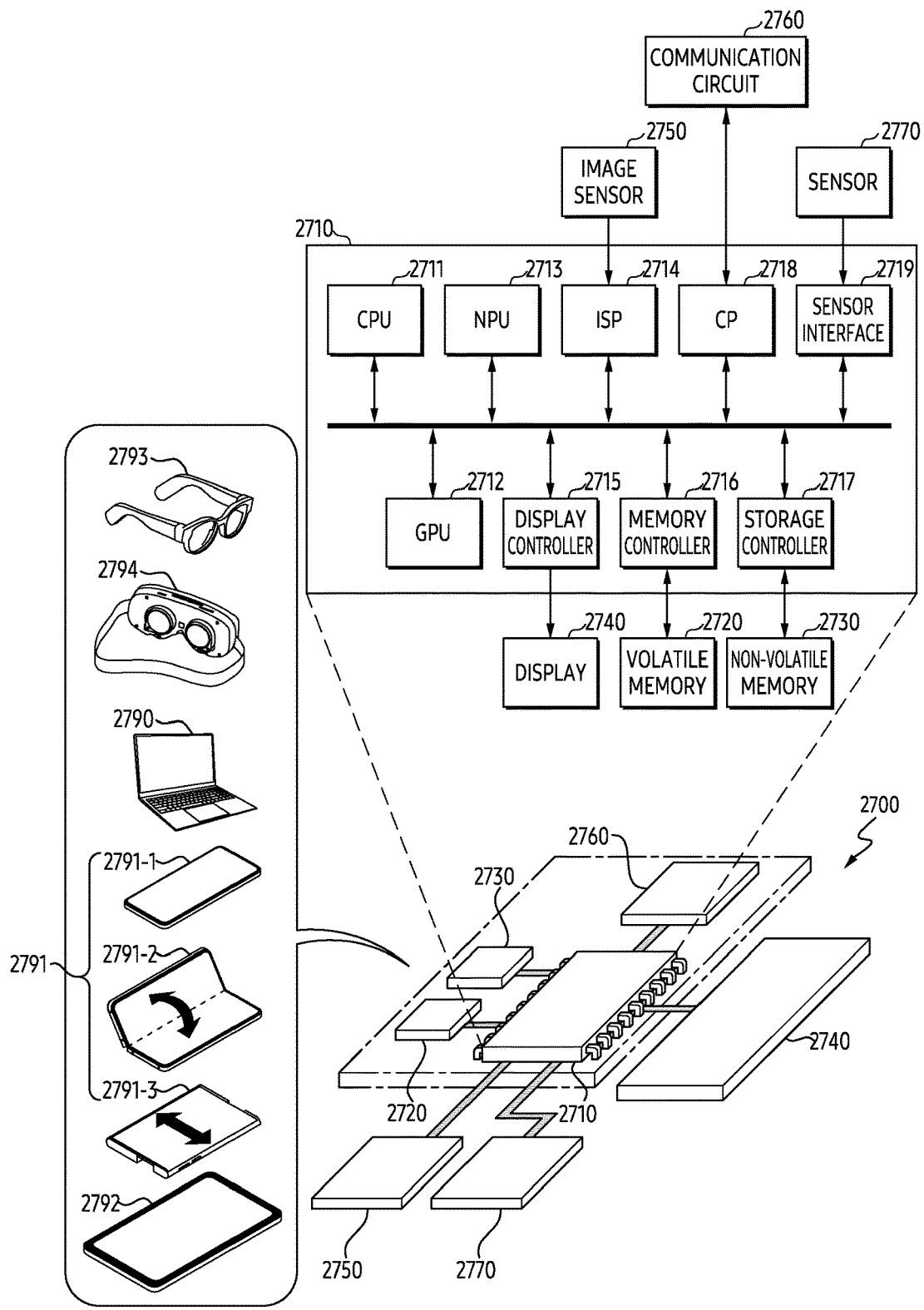
FIG. 27 illustrates an exemplary electronic device capable of performing the operations described in the present disclosure, according to an embodiment.

FIG. 27 illustrates an exemplary electronic device capable of performing the operations described in the present disclosure, according to an embodiment.

Referring to FIG. 27, the electronic device 2700 may be any one of various mobile devices such as e.g., a laptop 2790, smartphones 2791 having various form factors (e.g., a bar-type smartphone 2791-1, a foldable smartphone 2791-2, or a rollable smartphones 2791-3), a tablet 2792, wearable devices 2793 and 2794 (e.g., a wearable device 110), a cellular phone, or any other similar computing devices. The various components illustrated in FIG. 27, their relationships, and their functions are only of examples for convenience of explanation and are not intended to limit the implementations described or claimed in the disclosure thereto. The electronic device 2700 may be referred to as a user device, a multi-functional device, or a portable device.

The electronic device 2700 may include various components including a processor 2710, a volatile memory 2720, a non-volatile memory 2730, a display 2740, an image sensor 2750, a communication circuit 2760, and/or a sensor 2770. The components are merely for illustration. For example, the electronic device 2700 may include other components (e.g., a power management integrated circuit (PMIC), an audio processing circuit, or an input/output interface). For example, some components may be omitted from the electronic device 2700.

The processor 2710 may be implemented with one or more integrated circuit (IC) chips, and may execute various data processing. For example, the processor 2710 may be implemented as a system on chip (SoC) (e.g., one chip or chipset). The processor 2710 may include various sub-components inclusive of e.g., a central processing unit (CPU) 2711, a graphics processing unit (GPU) 2712, a neural processing unit (NPU) 2713, an image signal processor (ISP) 2714, a display controller 2715, a memory controller 2716, a storage controller 2717, a communication processor (CP) 2718, and/or a sensor interface 2719. The sub-components are merely for illustration. For example, the processor 2710 may further include other sub-components. For example, some sub-components may be omitted from the processor 2710.

The CPU 2711 may be configured to control the sub-components based on execution of instructions stored in the volatile memory 2720 and/or the non-volatile memory 2730. The GPU 2712 may include a circuitry configured to execute parallel operations (e.g., rendering). The NPU 2713 may include a circuitry configured to execute operations (e.g., convolution computations) for an artificial intelligence model. The ISP 2714 may include a circuitry configured to process a raw image obtained through the image sensor 2750 in a suitable format for the components in electronic device 2700 or the sub-components in the processor 2710. The display controller 2715 may include a circuitry configured to process an image obtained from the CPU 2711, the GPU 2712, the ISP 2714, or the volatile memory 2720 in a suitable format for the display 2740. The memory controller 2716 may include a circuitry configured to control reading out data from the volatile memory 2720 and writing data into the volatile memory 2720. The storage controller 2717 may include a circuitry configured to control reading out data from the non-volatile memory 2730 and writing data into the non-volatile memory 2730. The communication processor (CP) 2718 may include a circuitry configured to process the data obtained from a sub-component in the processor 2710 in a suitable format for transmitting via the communication circuit 2760 to other electronic device, or to process the data obtained through the communication circuit 2760 from other electronic device in a suitable format for processing in the sub-component. The sensor interface 2719 may include a circuitry configured to process data related to the state of the electronic device 2700 and/or the state around the electronic device 2700 in a suitable format for the sub-components in the processor 2710.

Figure 28:
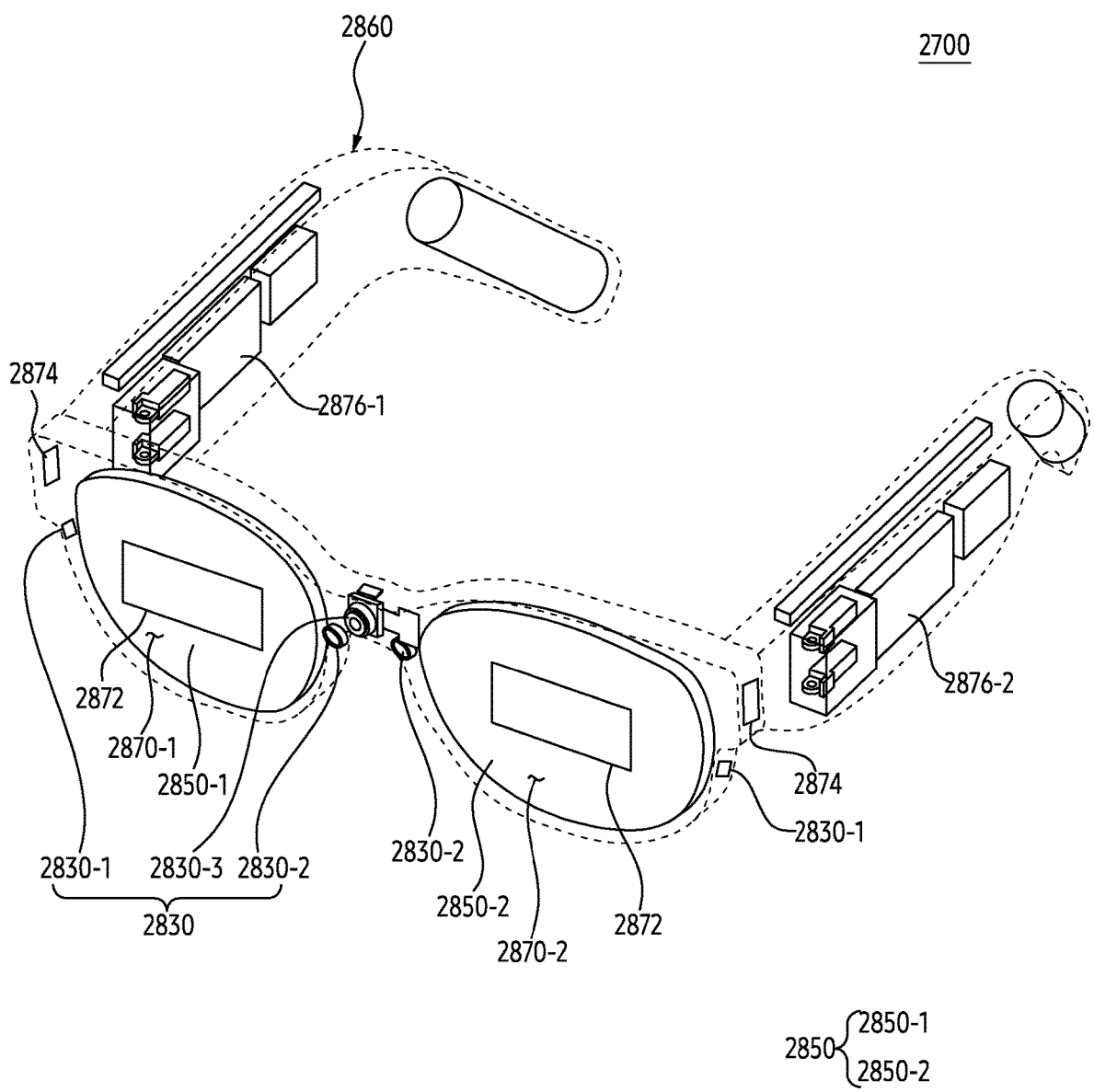
FIG. 28 is a perspective view illustrating an electronic device according to an embodiment.

FIG. 28 is a perspective view illustrating an electronic device according to an embodiment. For example, the electronic device may be the electronic device 2700 illustrated in FIG. 27.

Referring to FIG. 28, a frame 2860 of the electronic device 2700 may have a physical structure worn on a part of a user's body. For example, when the electronic device 2700 is worn by a user, the frame 2860 may be configured such that a first display 2850-1 in a display 2850 is located in front of the user's right eye and a second display 2850-2 in the display 2850 is located in front of the user's left eye.

In an embodiment, the display 2850 having the first display 2850-1 and the second display 2850-2 may include a liquid crystal display (LCD), a digital mirror device (DMD), a liquid crystal on silicon (LCoS), an organic light emitting diode (OLED), or a micro LED. In an embodiment, in the case that the display 2850 is configured of LCD, DMD, or LCoS, the electronic device 2700 may include a light source (not shown in FIG. 28) emitting light toward a display area of the display 2850. In an embodiment, in the case that the display 2850 is configured of OLED or micro LED, the electronic device 2800 may not include such a light source. However, the disclosure is not limited thereto.

In an embodiment, the electronic device 2700 may further include a first transparent member 2870-1 and a second transparent member 2870-2. For example, each of the first transparent member 2870-1 and the second transparent member 2870-2 may be formed of a glass plate, a plastic plate, or a polymer. For example, each of the first transparent member 2870-1 and the second transparent member 2870-2 may be either transparent or translucent.

In an embodiment, the electronic device 2700 may include a wave guide 2872. For example, the wave guide 2872 may be used to transmit the light source generated by the display 2850 to eyes of a user wearing the electronic device 2700. For example, the wave guide 2872 may be formed of glass, plastic, or a polymer. For example, the wave guide 2872 may include a nano pattern configured with a polygonal or curved lattice structure, within the wave guide 2872 or on a surface of the wave guide 2872. For example, light incident on one end of the wave guide 2872 may be provided to the user through the nano pattern. In an embodiment, the wave guide 2872 may include at least one of at least one diffraction element (e.g., a diffractive optical element (DOE), a holographic optical element (HOE), etc.), or a reflection element (e.g., a reflective mirror). For example, the at least one diffraction element or the reflection element may be used to induce light to the user's eyes. In an embodiment, the at least one diffraction element may include an input optical member and/or an output optical member. In an embodiment, the input optical member may imply an input grating area used as an input terminal of light, and the output optical member may imply an output grating area used as an output terminal of light. In an embodiment, the reflection element may include a total internal reflection (TIR) optical element or a TIR wave guide.

In an embodiment, a camera 2830 in the electronic device 2700 may include at least one first camera 2830-1, at least one second camera 2830-2, and/or at least one third camera 2830-3.

In an embodiment, the at least one first camera 2830-1 may be used for motion recognition or spatial recognition of 3DoF (three degrees of freedom) or 6DoF (six degrees of freedom). For example, the at least one first camera 2830-1 may be used for head tracking or hand detection. For example, the at least one first camera 2830-1 may be configured of a global shutter (GS) camera. For example, the at least one first camera 2830-1 may be configured of a stereo camera. For example, the at least one first camera 2830-1 may be used for gesture recognition.

In an embodiment, the at least one second camera 2830-2 may be used to detect and track a pupil. For example, the at least one second camera 2830-2 may be configured of a GS camera. For example, the at least one second camera 2830-2 may be used to identify a user input defined by a user's gaze.

In an embodiment, the at least one third camera 2830-3 may be referred to as a high resolution (HR) or photo video (PV) camera and may provide an auto focusing (AF) function or an optical image stabilization (OIS) function. In an embodiment, the at least one third camera 2830-3 may be configured of a GS camera or a remote shutter (RS) camera.

In an embodiment, the electronic device 2700 may further include an LED unit 2874. For example, the LED unit 2874 may be used to assist in tracking pupils through the at least one second camera 2830-2. For example, the LED unit 2874 may be formed of an IR LED. For example, the LED unit 2874 may be used to compensate for brightness, when the illuminance around the electronic device 2700 is relatively low.

In an embodiment, the electronic device 2700 may further include a first PCB 2876-1 and a second PCB 2876-2. For example, each of the first PCB 2876-1 and the second PCB 2876-2 may be used to transmit an electrical signal to components of the electronic device 2700, such as the camera 2830 or the display 2850. In an embodiment, the electronic device 2700 may further include an interposer disposed between the first PCB 2876-1 and the second PCB 2876-2. However, the disclosure is not limited thereto.

As described above, a wearable device 110 may include a camera 130, a display 120, and a processor. According to an embodiment, the processor may be configured to obtain, through the camera 130, an image representing an indoor environment in which the wearable device is located. According to an embodiment, the processor may be configured to display, through the display 120, a widget including information on a weather condition, in the image. According to an embodiment, the processor may be configured to identify an event that moves the widget. According to an embodiment, the processor may be configured to, in response to the event, identify a direction in which a region in the image, to which the widget is to be moved, faces. According to an embodiment, the processor may be configured to, based on the direction in which the region in the image faces being different from a reference direction, display the widget or a first visual object including at least part of the information in at least a portion of the region in the image. According to an embodiment, the processor may be configured to display, based on the direction in which the region in the image faces corresponding to the reference direction, a second visual object representing a virtual outdoor environment with the weather condition, in the region in the image.

According to an embodiment, the processor may be further configured to display, based on the direction in which the region in the image faces corresponding to the reference direction, a visual effect representing the indoor environment at least partially changed for representing the weather condition, with the second visual object, in another region in the image distinct from the region.

According to an embodiment, the visual effect may represent the indoor environment at least partially changed for representing the weather condition, by at least partially changing color of the indoor environment.

According to an embodiment, the processor may be further configured to display, based on the direction in which the region in the image faces corresponding to the reference direction, an animation representing the indoor environment in the weather condition. According to an embodiment, the processor may be configured to cease the display of the animation, based on identifying that a predetermined time has elapsed since the animation was initially displayed. According to an embodiment, the second visual object may be maintained in the region in the image after the predetermined time has elapsed.

According to an embodiment, the wearable device (110) may further include a speaker. According to an embodiment, the processor may be further configured to output audio signals indicating the weather condition through the speaker, while the second visual object is displayed.

According to an embodiment, the wearable device (110) may further include a communication circuit. According to an embodiment, the processor may be further configured to identify a geographical region in which the wearable device (110) is located through the communication circuit. According to an embodiment, the virtual outdoor environment may further represent the geographical region.

According to an embodiment, the virtual outdoor environment may further represent a current time.

According to an embodiment, the processor may be further configured to identify a size of the region, in response to the event. According to an embodiment, the processor may be further configured to display the second visual object, based on the direction in which the region in the image faces corresponding to the reference direction, and based on the size of the region being greater than or equal to a reference size. According to an embodiment, the processor may be further configured to display the widget or the first visual object, based on the direction in which the region in the image faces corresponding to the reference direction, and based on the size of the region being less than the reference size.

According to an embodiment, each of the first visual object and the widget may further include a text indicating at least a portion of the information with respect to the second visual object.

According to an embodiment, the processor may be further configured to recognize the region in response to the event. According to an embodiment, the processor may be further configured to identify, as a result of the recognition, that the region includes a third visual object corresponding to a real object in the indoor environment that has a predetermined type. According to an embodiment, the processor may be further configured to display the second visual object in the third visual object, based on identifying that the region includes the third visual object.

According to an embodiment, the processor may be further configured to recognize the region in response to the event. According to an embodiment, the processor may be further configured to identify, as a result of the recognition, that the region includes a plurality of partial regions that are capable of being associated with each other. According to an embodiment, the processor may be further configured to respectively display a plurality of visual elements into which the second visual object is divided, in the plurality of partial regions, in response to identifying that the region includes the plurality of partial regions.

According to an embodiment, the processor may be further configured to identify an aspect ratio of the region in response to the event. According to an embodiment, the processor may be further configured to display the second visual object, based on the direction in which the region in the image faces corresponding to the reference direction, and based on the aspect ratio of the region being within a predetermined range. According to an embodiment, the processor may be further configured to display the widget or the first visual object, based on the direction in which the region in the image faces corresponding to the reference direction, and based on the aspect ratio of the region being outside the predetermined range.

According to an embodiment, the event may include receiving a user input for moving the widget to the region.

According to an embodiment, the event may include identifying that the number of windows displayed in the image exceeds a predetermined number according to display of a new window.

According to an embodiment, a color of the second visual object may be identified based on a color of the region.

The electronic device according to various embodiments disclosed herein may be one of various types of electronic devices. The electronic devices may include, for example, a portable communication device (e.g., a smartphone), a computer device, a portable multimedia device, a portable medical device, a camera, a wearable device, or a home appliance. According to an embodiment, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software including one or more instructions that are stored in a storage medium that is readable by a machine. For example, a processor of the machine may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments disclosed herein may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A wearable device comprising:
a camera;
a display;
memory, storing instructions, comprising one or more storage medium; and
at least one processor comprising processing circuitry,
wherein the instructions, when executed by the at least one processor, cause the wearable device to:
 display, through the display, a widget including information on a weather condition, in an image obtained through the camera,
 identify an event that moves the widget,
 identify a region in the image to which the widget will be moved according to the event,
 identify whether a direction in which the region faces corresponds to a reference direction, for determining an object to be displayed in the region,
 based on identifying the direction being different from the reference direction:
  determine the object as the widget or a first visual object that includes at least a portion of the information, and
  display, through the display, the widget or the first visual object, in the region in the image, and
 based on identifying the direction corresponding to the reference direction:
  determine the object as a second visual object representing a virtual outdoor environment with the weather condition,
  change the widget to the second visual object, and
  display, through the display, the second visual object in the region in the image.

2. The wearable device of claim 1,
wherein the image represents a field of view (FoV) of the camera, and
wherein the instructions, when executed by the at least one processor, cause the wearable device to:
 at least partially change, based on identifying the direction corresponding to the reference direction, another region in the image different from the region in the image, for representing the weather condition, while the second visual object is displayed in the region in the image.

3. The wearable device of claim 2, wherein color of the other region in the image is at least partially changed according to at least partially changing of the other region in the image.

4. The wearable device of claim 1,
wherein the image represents an indoor environment in which the wearable device is located, and
wherein the instructions, when executed by the at least one processor, cause the wearable device to:
 further display, based on the direction corresponding to the reference direction, an animation for representing the weather condition, as superimposed on the image, and
 cease the display of the animation, based on identifying that a predetermined time has elapsed since the animation was initially displayed, and
wherein the second visual object is maintained in the region in the image after the predetermined time has elapsed.

5. The wearable device of claim 1, further comprising:
a speaker,
wherein the instructions, when executed by the at least one processor, cause the wearable device to:
output audio signals indicating the weather condition through the speaker, while the second visual object is displayed.

6. The wearable device of claim 1, further comprising:
a communication circuit,
wherein the instructions, when executed by the at least one processor, cause the wearable device to:
identify a geographical region in which the wearable device is located through the communication circuit, and
wherein the virtual outdoor environment further represents the geographical region.

7. The wearable device of claim 1, wherein the virtual outdoor environment further represents a current time.

8. The wearable device of claim 1, wherein the instructions, when executed by the at least one processor, cause the wearable device to:
identify a size of the region, in response to the event,
identify whether the size of the region is greater than a reference size,
determine the object as the second visual object, based on the direction corresponding to the reference direction, and based on the size of the region being greater than the reference size, and
determine the object as the widget or the first visual object, based on the direction corresponding to the reference direction, and based on the size of the region being less than the reference size.

9. The wearable device of claim 1, wherein each of the first visual object and the widget further includes text indicating at least a portion of the information, relative to the second visual object.

10. The wearable device of claim 1, wherein the instructions, when executed by the at least one processor, cause the wearable device to:
recognize the region in response to the event,
identify, based on a result of the recognition, that the region includes a third visual object corresponding to a real object in a field of view (FoV) of the camera, the real object having a predetermined type, and
display the second visual object in the third visual object, based on the third visual object or the real object.

11. The wearable device of claim 1, wherein the instructions, when executed by the at least one processor, cause the wearable device to:
recognize the region in response to the event,
identify, based on a result of the recognition, that the region includes a plurality of partial regions that are capable of being associated with each other, and
respectively display a plurality of visual elements into which the second visual object is divided, in the plurality of partial regions, in response to identifying that the region includes the plurality of partial regions.

12. The wearable device of claim 1, wherein the instructions, when executed by the at least one processor, cause the wearable device to:
identify an aspect ratio of the region in response to the event,
identify whether the aspect ratio of the region is within a predetermined range,
determine the object as the second visual object, based on the direction corresponding to the reference direction, and based on the aspect ratio of the region being within the predetermined range, and
determine the object as the widget or the first visual object, based on the direction corresponding to the reference direction, and based on the aspect ratio of the region being outside the predetermined range.

13. The wearable device of claim 1, wherein the event includes receiving a user input for moving the widget to the region.

14. The wearable device of claim 1, wherein the event includes identifying that a number of windows displayed in the image exceeds a predetermined number according to display of a new window.

15. The wearable device of claim 1, wherein color of the second visual object is identified based on color of the region.

16. A method executed in a wearable device with a camera and a display, the method comprising:
displaying, through the display, a widget including information on a weather condition, in an image obtained through the camera;
identifying an event that moves the widget;
identifying a region in the image to which the widget will be moved according to the event;
identifying whether a direction in which the region faces corresponds to a reference direction, for determining an object to be displayed in the region;
based on identifying the direction being different from the reference direction:
determining the object as the widget or a first visual object that includes at least a portion of the information, and
displaying, through the display, the widget or the first visual object, in the region in the image; and
based on identifying the direction corresponding to the reference direction:
determining the object as a second visual object representing a virtual outdoor environment with the weather condition,
changing the widget to the second visual object, and
displaying, through the display, the second visual object in the region in the image.

17. The method of claim 16,
wherein the image represents a field of view (FoV) of the camera, and
wherein the method further comprises:
at least partially changing, based on identifying the direction corresponding to the reference direction, another region in the image different from the region in the image, for representing the weather condition, while the second visual object is displayed in the region in the image.

18. The method of claim 17, wherein color of the other region in the image is at least partially changed according to at least partially changing of the other region in the image.

19. The method of claim 16, further comprising:
displaying, based on the direction corresponding to the reference direction, an animation for representing the weather condition, as superimposed on the image; and
ceasing the display of the animation, based on identifying that a predetermined time has elapsed since the animation was initially displayed,
wherein the second visual object is maintained in the region in the image after the predetermined time has elapsed.

20. The method of claim 16, further comprising:
 outputting audio signals indicating the weather condition through a speaker of the wearable device, while the second visual object is displayed.

\* \* \* \* \*